US009401028B2

(12) United States Patent
Kuehnle et al.

(10) Patent No.: US 9,401,028 B2
(45) Date of Patent: Jul. 26, 2016

(54) METHOD AND SYSTEM FOR VIDEO-BASED ROAD CHARACTERIZATION, LANE DETECTION AND DEPARTURE PREVENTION

(71) Applicant: VALEO SCHALTER UND SENSOREN GMBH, Bietigheim-Bissingen (DE)

(72) Inventors: Andreas Kuehnle, Villa Park, CA (US); Cathy Boon, Orange, CA (US)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 415 days.

(21) Appl. No.: 14/109,855

(22) Filed: Dec. 17, 2013

(65) Prior Publication Data
US 2014/0177914 A1 Jun. 26, 2014

Related U.S. Application Data

(63) Continuation of application No. 12/523,850, filed as application No. PCT/EP2008/000488 on Jan. 23, 2008, now abandoned.

(60) Provisional application No. 60/897,082, filed on Jan. 23, 2007, provisional application No. 60/897,220, filed on Jan. 23, 2007, provisional application No. 60/897,225, filed on Jan. 23, 2007, provisional application No. 60/897,219, filed on Jan. 23, 2007.

(51) Int. Cl.
*G06K 9/00* (2006.01)
*G06T 7/20* (2006.01)
*G06T 7/60* (2006.01)

(52) U.S. Cl.
CPC .......... *G06T 7/2033* (2013.01); *G06K 9/00798* (2013.01); *G06T 7/60* (2013.01)

(58) Field of Classification Search
None
See application file for complete search history.

(56) References Cited

U.S. PATENT DOCUMENTS

| 4,970,653 | A | 11/1990 | Kenue |
| 5,675,489 | A | 10/1997 | Pomerleau |
| 5,809,161 | A | 9/1998 | Auty et al. |
| 6,292,111 | B1 | 9/2001 | Ishikawa et al. |
| 6,445,809 | B1 | 9/2002 | Sasaki et al. |
| 6,456,730 | B1 * | 9/2002 | Taniguchi ............ 382/107 |
| 7,212,901 | B2 | 5/2007 | Sadano et |
| 2004/0016870 | A1 | 1/2004 | Pawlicki et al. |
| 2004/0164851 | A1 | 8/2004 | Crawshaw |
| 2006/0106518 | A1 | 5/2006 | Stam et al. |
| 2006/0206243 | A1 | 9/2006 | Pawlicki et al. |

* cited by examiner

*Primary Examiner* — Stephen R Koziol
*Assistant Examiner* — Raphael Schwartz
(74) *Attorney, Agent, or Firm* — Rothwell, Figg, Ernst & Manbeck, P.C.

(57) ABSTRACT

A method and system for video-based road departure warning for a vehicle on a road, is provided. Road departure warning involves receiving an image of a road in front of the vehicle from a video imager, and detecting one or more road markings in the image corresponding to markings on the road. Then, analyzing the characteristics of an image region beyond the detected markings to determine a rating for drivability of the road corresponding to said image region, and detecting the lateral offset of the vehicle relative to the markings on the road based on the detected road markings. A warning signal is generated as function of said lateral offset and said rating.

31 Claims, 32 Drawing Sheets

| | |
|---|---|
| In a Row | $AverageNearMAD \rightarrow \overline{MAD}_{Near}$<br>$AverageFarMAD \rightarrow \overline{MAD}_{Far}$ |
| Compare | Form the Ratio of Averages,<br>$\delta = \left| \overline{MAD}_{Near} / \overline{MAD}_{Far} \right|$ |
| Rule | If $\delta \approx 1.0$, then Near and Far are Probably Similar |

METHOD AND SYSTEM FOR VIDEO-BASED ROAD CHARACTERIZATION, LANE DETECTION AND DEPARTURE PREVENTION

CROSS REFERENCE TO RELATED APPLICATIONS

This application is a continuation of U.S. patent application Ser. No. 12/523,850, filed Oct. 6, 2009, which is a 35 U.S.C. §371 National Phase Entry Application from PCT/EP2008/000488, filed Jan. 23, 2008 and designating the United States, which claims priority under 35 U.S.C. 119(e) from: (1) U.S. Provisional Patent Application Ser. No. 60/897,082, filed Jan. 23, 2007; (2) U.S. Provisional Patent Application Ser. No. 60/897,220, filed Jan. 23, 2007; (3) U.S. Provisional Patent Application Ser. No. 60/897,225, filed Jan. 23, 2007; and (4) U.S. Provisional Patent Application Ser. No. 60/897,219, filed Jan. 23, 2007. The disclosures of each of the above-referenced applications are incorporated herein by reference.

FIELD OF THE INVENTION

The present invention relates to image processing methods and systems for roadway scenes, for use in vehicles.

BACKGROUND OF THE INVENTION

Images from a video camera installed on a vehicle are used in certain conventional approaches to find stripe or solid type lane markings. However, such approaches cannot detect sparsely spaced, white, domed, discs called Botts' dots. Other conventional approaches are limited to determining the camera distance and yaw angle to lane markings and their curvature. Such approaches cannot detect delineations and objects other than the lane markings, and are limited to finding a pair of lane markings, one to the left of the vehicle and one to the right. In such approaches, localization of the road boundary is not considered and neither is any further characterization of the road. Yet other approaches require pre-storing lane data for use as a reference later.

BRIEF SUMMARY OF THE INVENTION

The present invention provides a method and system for video-based road departure warning for a vehicle on a road. Road departure warning involves receiving an image of a road in front of the vehicle from a video imager and detecting one or more road markings in the image corresponding to markings on the road. Then, analyzing characteristics of an image region beyond the detected markings to determine a rating for drivability of the road corresponding to said image region, and detecting a lateral offset of the vehicle relative to the markings on the road based on the detected road markings. A warning signal is generated as a function of said lateral offset and said rating.

These and other features, aspects and advantages of the present invention will become understood with reference to the following description, appended claims and accompanying figures.

DETAILED DESCRIPTION OF THE INVENTION

The present invention provides a method and system for video-based road characterization, lane detection and departure prevention. In one embodiment, this is a system wherein images of a road ahead of a video camera installed on a moving vehicle are used to find lane markings including lines and dashes on the road surface. The locations of the found marking in the image are combined with camera geometry information to reconstruct where the camera (vehicle) is on the road, measured relative to the markings. The reconstructed camera location information is used to support a driver in driving the vehicle.

Using a sequence of essentially real-time image frames from the camera, the system further detects delineations and objects, in addition to lane markings. Localization of the road boundary information, and further characterization of the road, are used in detecting lateral location (offset) relative to the boundaries of the road. The system generates essentially real-time information regarding vehicle location on a roadway, along with road characterization, to aid in driving the vehicle as in a lane departure warning approach, for guiding the vehicle down the road.

The system implements road-surface-reflection detection and suppresses such reflections in road boundary detection (such reflections, or other objects, such as tar strips, may interfere with proper detection of road boundaries). The system may further address road boundary detection with difficult markings, marking classification, difficult lighting accommodation, difficult weather recognition, false road marking rejection, etc. The system may recognize multiple lines, in multiple lanes, and select the proper lane markings (generally laterally nearest to the vehicle), when multiple lines are present. The system may further detect road edges when lane markings are not present, using road edge information instead of lane markings, to aid guiding the vehicle down the road.

The system may further locate intermittent markings (such as Bott's dots and reflectors) on the road, and determine vehicle location on the road from these. Once potential marking information (potential marking pieces) is gathered from the image, the system makes multiple passes through such information, as needed, to detect the vehicle location on the road.

Figure 1:
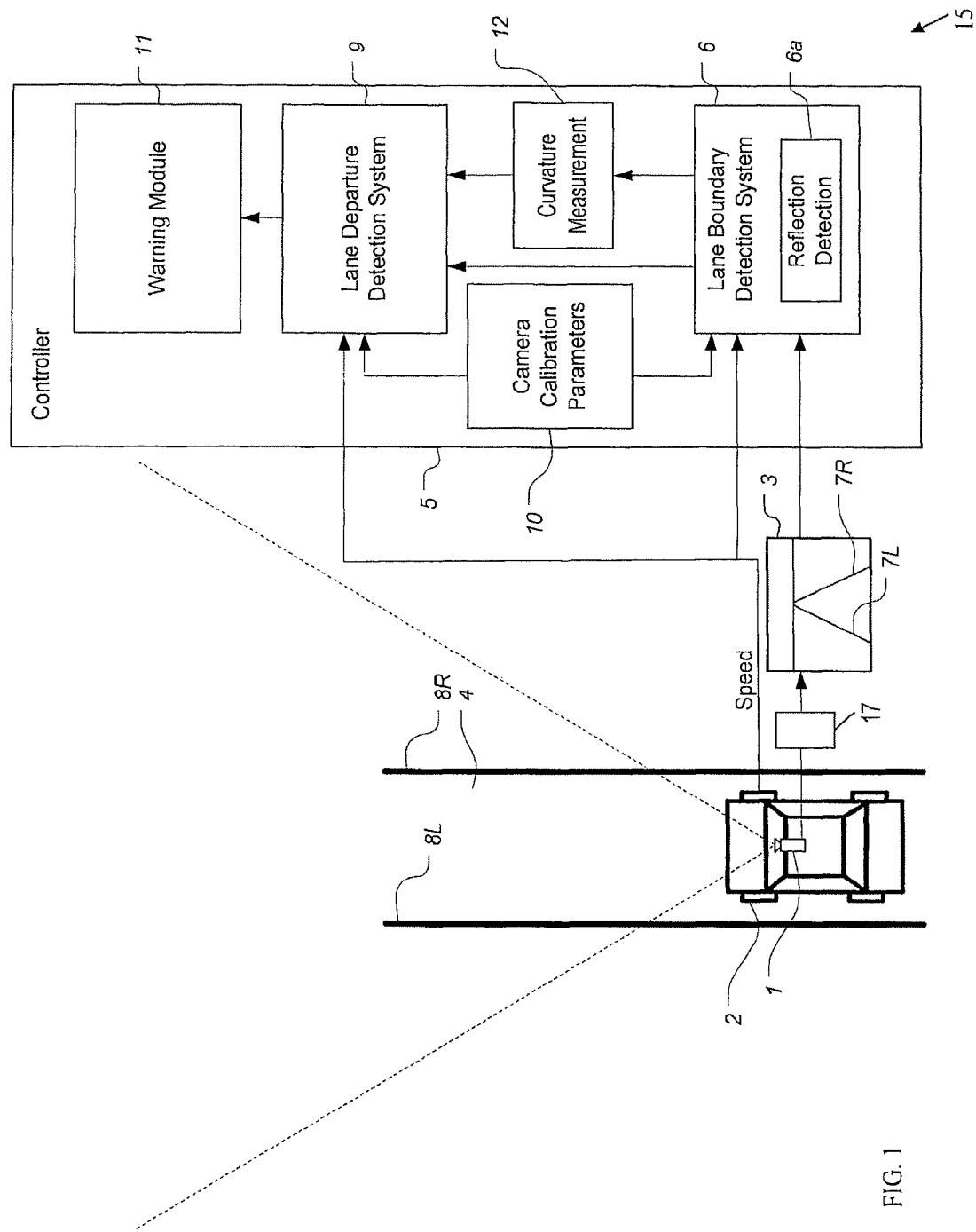
FIG. 1 shows a functional block diagram of a video-based road characterization, lane detection and departure prevention system in conjunction with a vehicle, according to an embodiment of the invention.

FIG. 1 shows a functional block diagram of a system 15 for video-based road characterization, lane detection and departure prevention, in conjunction with a vehicle 2 with a forward looking mounted video camera 1, according to an embodiment of the invention. The video camera 1 is mounted to the vehicle 2 in a forward pointing direction. The camera 1 captures (two dimensional (2-D)) images 3 of the lane (road/roadway) 4 in front of the vehicle 2 and transmits those images to a controller 5 for road characterization, lane detection and departure prevention. A sampler 17 may be used for sampling digitized video input signals to create a two-dimensional image as an array of pixels arranged in rows and columns.

In this example, the controller 5 includes a lane detector 6, a lane departure detector 9, a camera calibration module 10, a warning module 11 and a curvature measurement module 12. The lane detector 6 processes the image 3 by road characterization and tracks in the image 3, positions of image features 7L and 7R that represent the actual markings 8L, 8R, respectively, on the roadway 4. The lane detector 6 includes a reflection detection module, 6a, which detects road-surface reflections in the image 3 and reduces (suppresses) their contribution in detecting image features 7L and 7R. In relation to camera 1, marking 8L represents the left side of the road, and marking 8R represents the right side of the road. The positions and yaw angles of the markings 7L and 7R (relative to the camera position) are provided to lane departure detector 9 by the lane detector 6. Using the detected lane marking or road boundary information from the boundary detector 6, the curvature measurement module measures the road curvature and provides that information to the lane departure detector 9. The lane departure detector 9 also receives speed information from the vehicle 2, and further receives calibration data (which may be provided by the calibration module 10). The lane departure detector 9 preferably receives vehicle speed, lane marking position, curvature information, and yaw angle information, on a regular basis, to determine position of the vehicle 1 in relation to markings 8R, 8L. The markings 8R, 8L may include lane markings, road boundaries, etc.

Based on the vehicle speed information, camera calibration information, the tracked marking positions the markings 7L and 7R, the controller 5, using the lane departure detector 9, determines if the vehicle 2 is leaving its proper lane of travel on the road 4. If the lane departure detection system does detect an imminent lane or road departure, then the warning module 11 is invoked. Specifically, the lane boundary detector 6 determines where to look for the boundaries or lane markings in the image 3, and detects image features such as road boundaries or lane markings (7L, 7R) in each image 3. The lane departure detector 9 relates such detected image features (7L, 7R) to locations on the road surface by geometrical transformations based on camera geometry information, and thereby reconstructs where the camera (vehicle) is on the road relative to the actual lane markings or road boundaries (8L, 8R). The lane departure detector 9 also determines when the camera (vehicle) is too close to a road boundary or lane marking, and alerts the warning module 11 accordingly.

The controller 5 may additionally function to detect markings or boundaries in difficult circumstances, using multiple passes through image features that may be pieces of lane marking or road boundaries. The controller 5 may additionally function to: reject features in the image that are not boundaries or markings, predict a region of interest in the next image for detecting road boundaries or lane markings, detect a new, more relevant boundary or lane marking, and determine that departing the road or lane may be consequential. The additional functions may enable the controller 5 to reduce false alarms by enhancing proper detection of markings or boundaries.

Using information from the calibration module 10, the boundary detector 6 initially makes a basic prediction of regions of interest in an image for detection lane markings or round boundaries. The boundary detector 6 then obtains an image frame (pixels arranged in rows and columns) from the camera 1, and checks in the regions of interest in the image to detect the location of marking features (lane marking or road boundary 7L, 7R) in terms of row and column location in the image. The lane departure detector 9 then uses the row and column location of detected marking features in the image 3 to determine corresponding locations on the road surface, wherein each such corresponding location is defined in terms of lateral offset of a marking (8L, 8R) to the camera 1, and distance of a marking ahead of the camera. The lane departure detector 9 determines the lateral position of the camera 1 (and vehicle 2) relative to the said locations of markings on the road surface. If the lateral position is too close to the location of a marking on the road, then the lane departure detector 9 generates a warning accordingly. The controller 5 then repeats the marking detection (via boundary detector 6) and vehicle location detection (via lane departure detector 9) for a next image frame from the camera, using the location of marking features detected in the current image as regions of interest for detecting marking features in the next image frame.

Figure 2:
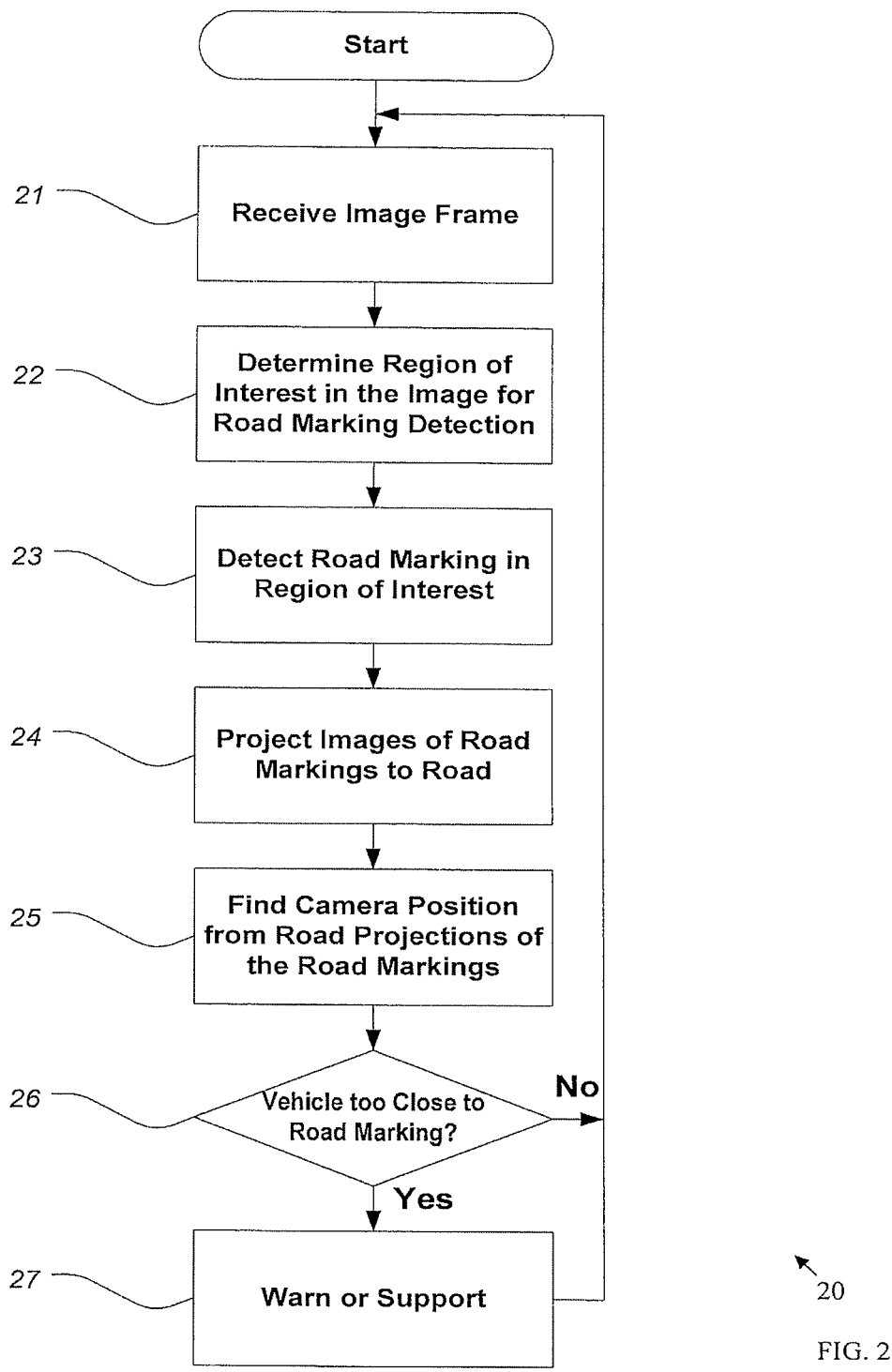
FIG. 2 shows an overall flowchart of the steps of a process video-based road characterization, lane detection and departure prevention process according to an embodiment of the present invention.

FIG. 2 shows a flowchart of the steps of an overall lane marking detection and departure warning process 20 performed by the controller 5, according to an embodiment of the present invention, including the following steps:

Step 21: Receive image frame.

Step 22: Determine region of interest (ROI) in the image for detecting marking features 7L, 7R corresponding to road marking features 8L, 8R (e.g., lane marking, road boundary, etc.).

Step 23: Detect marking features from pixels of regions of interest.

Step 24: Perform a geometrical transformation to project the image locations of road markings to the corresponding locations on the road, producing a road projection.

Step 25: Find the camera position from the road projections of the road markings.

Step 26: Determine if camera/vehicle is too close to a road marking. If yes, go to step 27, else go back to step 21 to receive and process next image frame from the camera.

Step 27: Warn or support; go back to step 21.

One implementation of the process 20 in the controller 5 includes the following progression:

Receive an image of the road ahead.

Determine one or more regions of interest (ROI) where markings or boundaries are expected in the image, using past image information, if available.

In each ROI, process image rows to identify and ignore any undesirable image artifacts (e.g., reflections, sun stripes, tar stripes, etc.)

Process ROI rows to detect marking and road boundary pieces.

On dashed markings (broken markings), remove marking piece detections present in gaps between dashes.

Filter the marking/boundary pieces (e.g., detect and remove image features representing falling snow, etc.).

Assemble remaining marking pieces from different rows into potential lane markings and road boundaries.

Remove false markings (e.g., detect and remove tar strips, arrows, and characters), to obtain final markings and marking pieces, with their (row, column) coordinates in the image.

Detect objects beyond the markings for potential objects of consequence.

Project the marking points (row, column) from the image, to the corresponding marking locations (distance ahead, lateral offset) on the road plane relative to the camera.

Filter said corresponding road marking location data for smoothing and noise removal.

Relate the smoothed marking location data back to the camera location.

Determine if the camera (vehicle) is too close to a boundary or lane marking.

When camera/vehicle is too close or a lane marking or road boundary, generate a signal accordingly, modulating the warning or support as a function of what is beyond the marking or boundary (e.g., degree of danger posed by leaving the lane or road) and the marking type and number.

Predict the image location (ROI) for the next boundary/marking in the road plane and determine the uncertainty of the prediction.

The system has two states, called search and track. In the search state, the system has not yet determined where approximately in the image (ROI) a marking may be, and so looks for a marking in large image area. In the track state, the system has recently found a marking and so expects a marking again, in about the same area (ROI) in the image, thereby tracking markings in the ROIs. A track is a sequence of location measurements that belong together. A new track starts when one sequence terminates and another starts. When tracking has ceased (e.g., because marking were not detected in a to number of images while the vehicle has traveled a certain distance), the system returns to the search state, and restores the boundary/marking finding windows ROI to their maximum size and default locations to search for markings anew, so not relying on an expected location for the markings based on marking detection in prior images.

If the next frame is expected to be an image of difficult road circumstances (e.g., rain, snow), then work around it in the next frame(s), involving reducing the size of the regions of interest and thereby continuing to track the current road marking (i.e., instead of tracking a new road marking).

Check for clutter (multiple, confusing measurements) in the image. If present, work around it, by accepting no detections during clutter, until clutter is again reduced.

Check if it is day or night. Switch system parameter sets if needed, adapting to the prevailing lighting conditions, before the next image frame is processed.

Using the detected lane marking or road boundary information, measure the road curvature via the curvature measurement module 12, and store the curvature value.

Determine the type of marking detected by checking how often and for how long a distance a marking was last detected.

Gather and output, if desired, the detected information (e.g., vehicle location relative to markings/boundaries, the number and type of markings, lanes, detected objects beyond markings/boundaries, road curvature, etc.).

Perform real-time camera calibration, improving the initial yaw and pitch angle measurements. The improved yaw and pitch angles are used to more correctly project the location of detected features from the image to the corresponding locations on the road. Warnings thereby become more precise.

Check for any text characters or symbols on the road ahead, determining where these will be in the next image frame.

Check for reflections and sun stripes, storing their locations and a prediction of their location in the next frame (this improves the detection of lane marking features in the next image frame).

Learn the dash-gap pattern when applicable, and store the predicted dash-gap locations for the next frame.

From the predicted, next measurement (in the road plane), determine the ROI in the image plane for a marking/boundary in the next image frame.

Repeat the above steps for the next image frame from the camera 1.

Figure 3A:
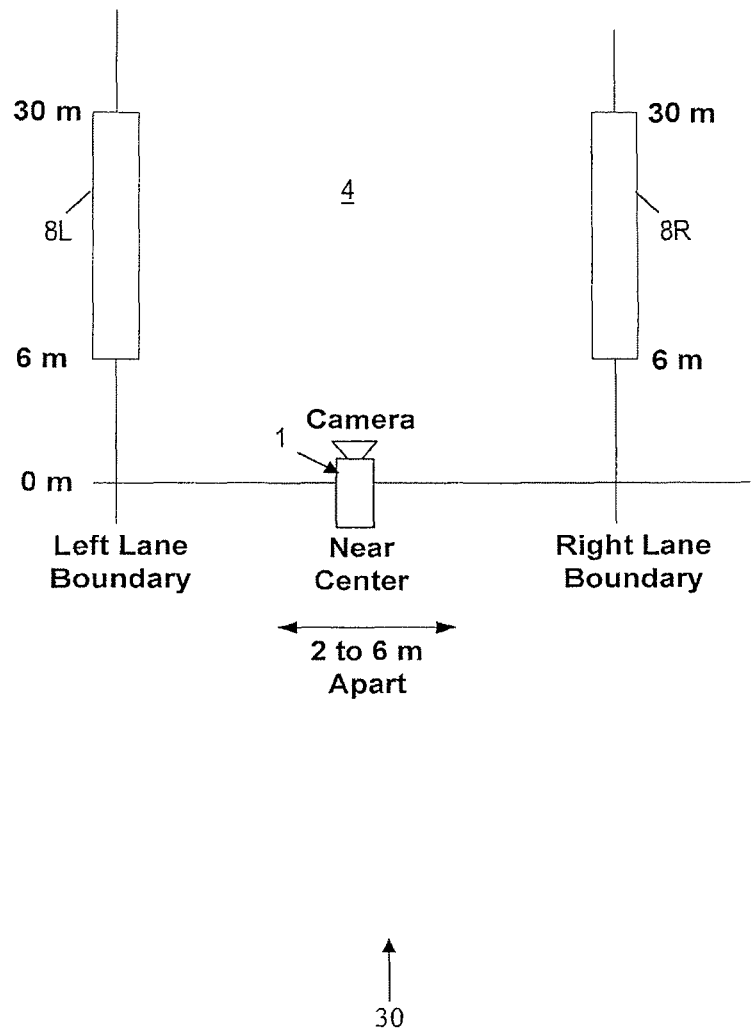
FIG. 3A shows a top view an example placement of a video camera in relation to road marking on the roadway.
Figure 3B:
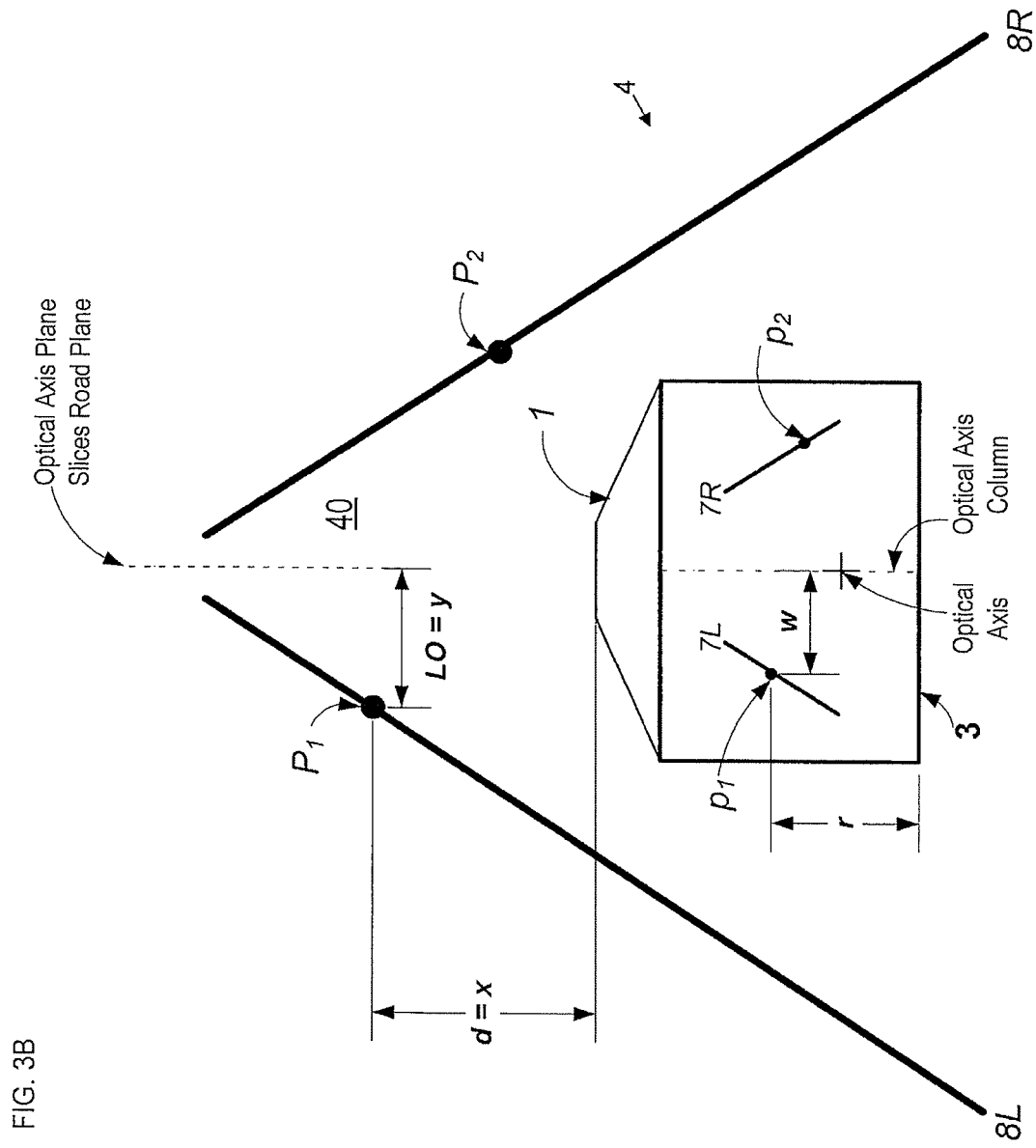
FIG. 3B shows an example illustrating the relationship between pixels in the image plane and corresponding points on the road plane that produced the image pixels via the camera.

FIG. 3A shows an example top view of the position of the camera 1 relative to road markings 8L, 8R, and also shows example dimensions for 8L and 8R. Those skilled in the art will appreciate that other camera positioning and road marking dimensions are possible. For a better understanding of the lane/boundary detection process, FIG. 3B shows an example illustrating the relationship between pixels in the image plane and corresponding points P on the road plane that produced the image pixels p via the camera 1. An image 3 of the road 4 is superimposed on the plane 40 of the road 4. A first pixel p1 at a first row and column position in the image 3 corresponds to a first road plane point $P_1$. Similarly, a second pixel $p_2$ at a second row and column position in the image 3 in the image corresponds to a road plane point $P_2$. Geometrically transforming (projecting) from the pixel $p_1$ at image position (r, w) to the point $P_1$ at road plane position (x, y), involves finding the coordinate x based on row r, and finding the coordinate y based on column w. A similar transformation is applied for the point $P_2$ and the pixel $p_2$.

Figure 3C:
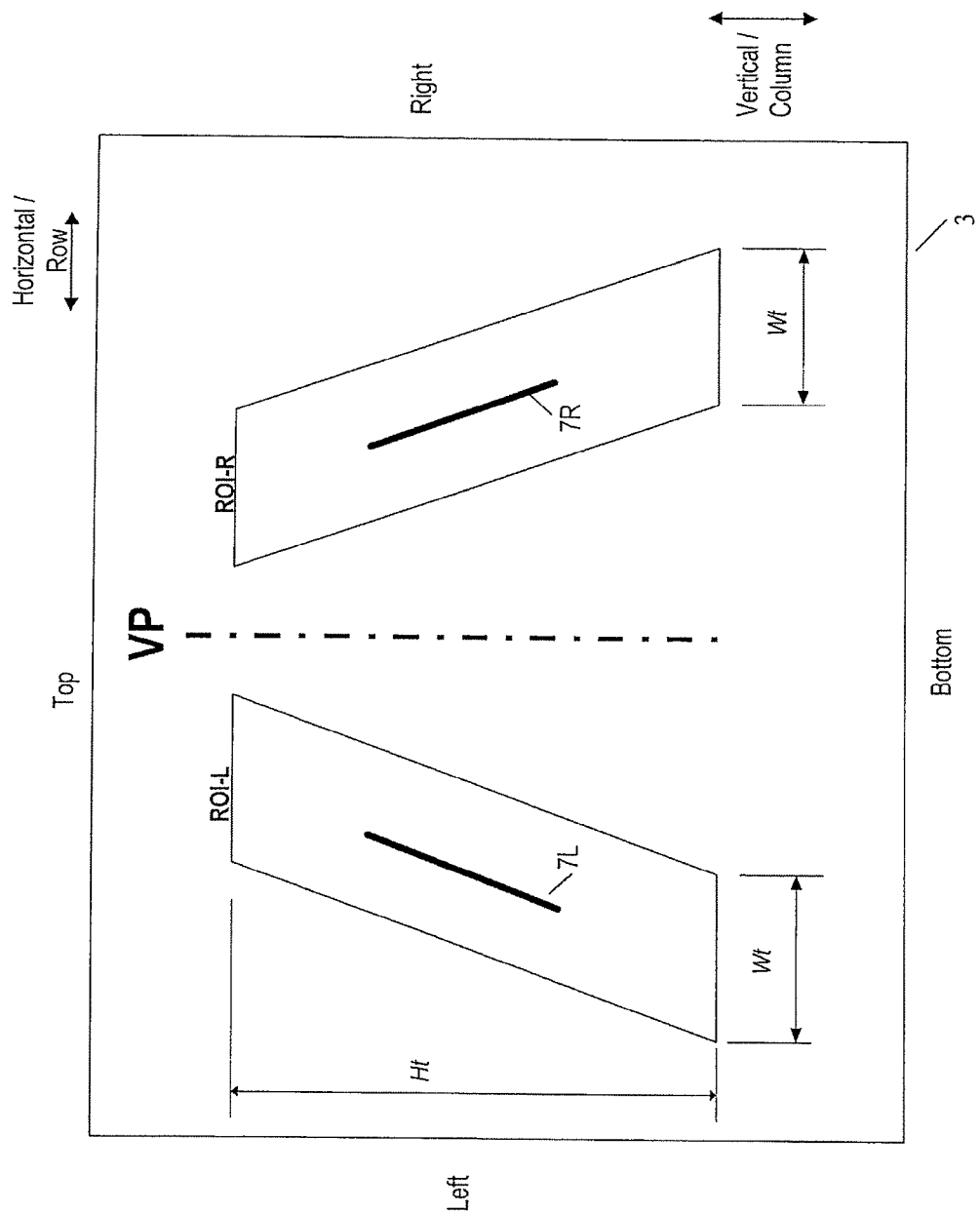
FIG. 3C shows trapezoid-shaped regions of interest (ROI) super-imposed onto the video image, within which gray level gradients and mean absolute deviations, are extracted from the image pixels.

As such, given the points $P_1$ and $P_2$, on the markings 8L and 8R, the distance of each point from the camera 1 (i.e., longitudinal distance ahead of the camera d=x, and the lateral offset distance from the road centerline, LO=y) can be determined from the row and column (i.e., r, w) positions of corresponding pixels $p_1$ and $p_2$ on the marking images 7L, 7R, in the image 3. FIG. 3C shows trapezoid-shaped regions of interest (ROI) superimposed onto the video image 3, within which gray level gradients and, optionally, mean absolute deviations, are extracted from the image pixels. Both the gradient and deviation values are properties of groups of pixels, one describing the contrast between neighboring pixels and the other the variation of a group from a central value, respectively. Each trapezoid (e.g., ROI-L, ROI-R) is placed approximately where image marking features (e.g., 7L, 7R) are expected to be in the image 3. The road image 3 and vehicle speed are the detection system inputs, and the camera calibration geometry (focal length, mounting height, etc.) is known.

Figure 3D:
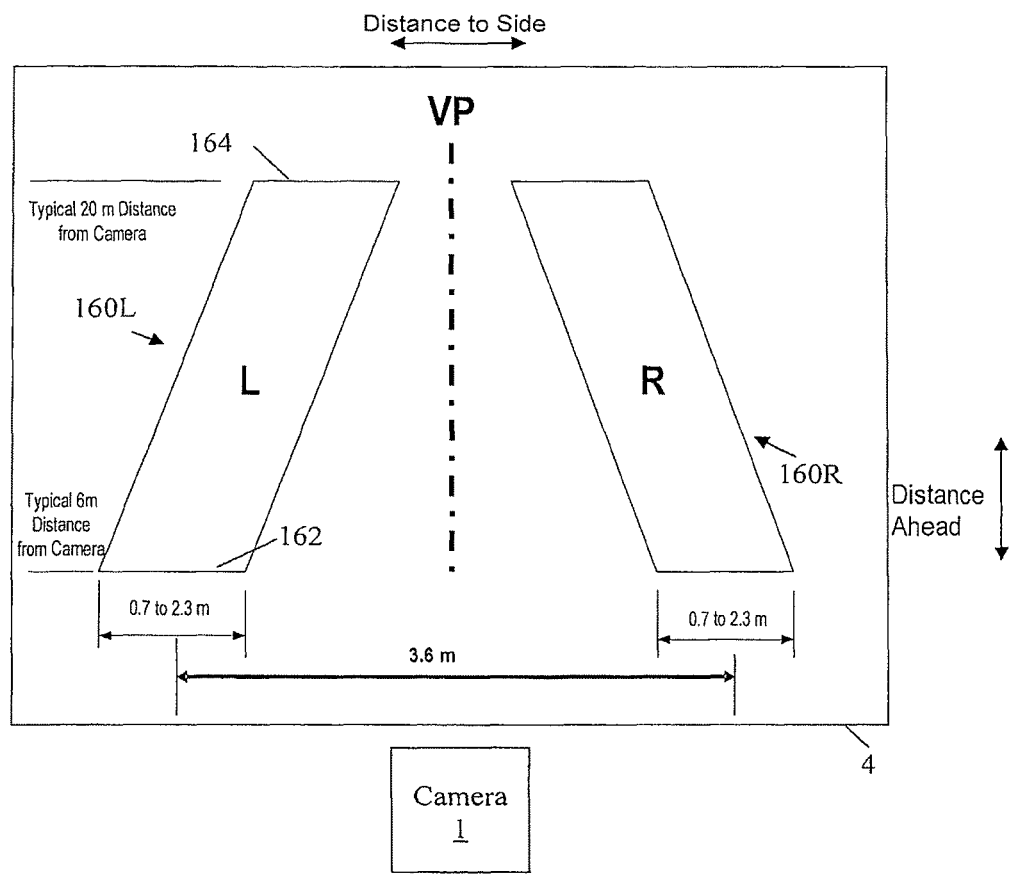
FIG. 3D shows regions of interest on the road plane.
Figure 3E:
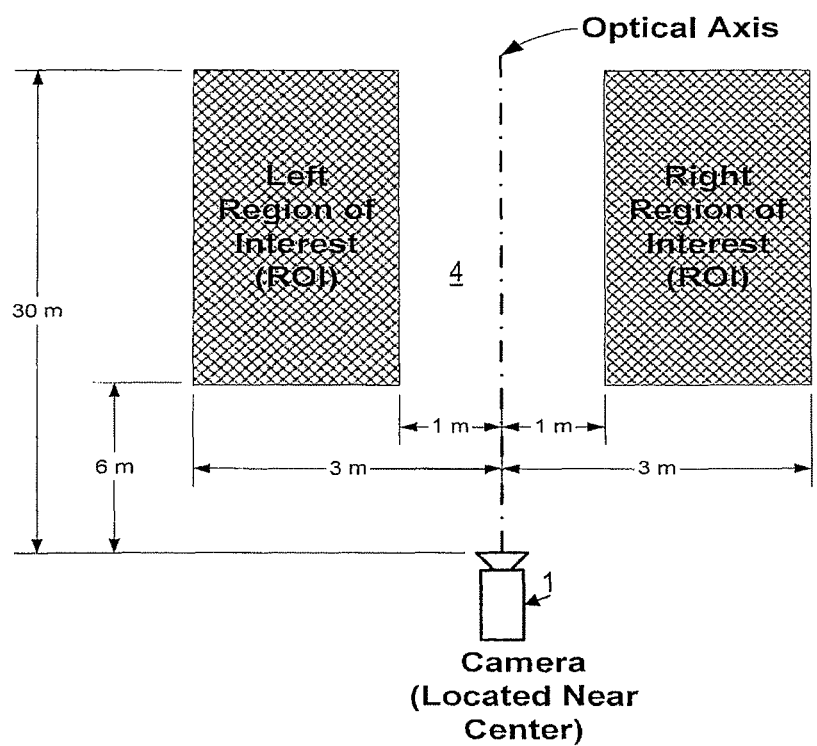
FIG. 3E shows an example of approximate regions of interest in the road plane where lane boundaries are expected.

Referring to FIG. 3C, trapezoid-shaped regions of interest or windows (ROI) are identified in the image 3, within which the determination of gray level gradients and mean absolute deviations of pixels, is performed. Each trapezoid shape ROI in the image 3 corresponds to a parallelogram shape on the road 4 (e.g., ROI-L and ROI-R correspond to a pair of parallelograms 160-L, 160-R, respectively on the road 4 shown in FIG. 3D, spaced laterally 3 to 4 meters apart, wherein each parallelogram is, for example, about 0.7 to 2.3 meters wide, about 14 meters long, with a lower edge about 6 meters from the camera 1 and an upper edge about 20 meters from the camera). The size of each ROI in the image, given by its width (Wt) and height (Ht), is sufficiently large to accommodate errors in the expected location of image features of markings 7L, 7R therein. When the general location of the marking images 7L, 7R is not known, then the region of interest (or window) is maximally sized in width. FIG. 3E shows another example of approximate regions of interest in the road plane where lane boundaries are expected.

In another example, each ROI corresponds to the parallelogram shape on the road that is at least four minimum marking 8L or 8R widths wide (but at most 2.3 meters wide). The upper width limit is constrained by computational capacity. Each ROI covers a distance on the road 4 starting about 0.7 meters to the left (or right) of the camera, going out to about 3 meters, covering the great majority of road lane and vehicle widths. The width of the windows ROI-L and ROI-R is at a maximum when in the marking search state, and smaller in the marking tracking state, its size depending on the uncertainty in the prediction of the lateral location of the markings in the image. The regions of interest are initially placed symmetrically about the vanishing point VP of the road in the image. In tracking state, when a marking or boundary has been detected in an ROI in a current image frame, then an ROI for the next image frame is placed where the marking or boundary is expected in the next image frame based on its location in the current image frame.

Figure 4A:
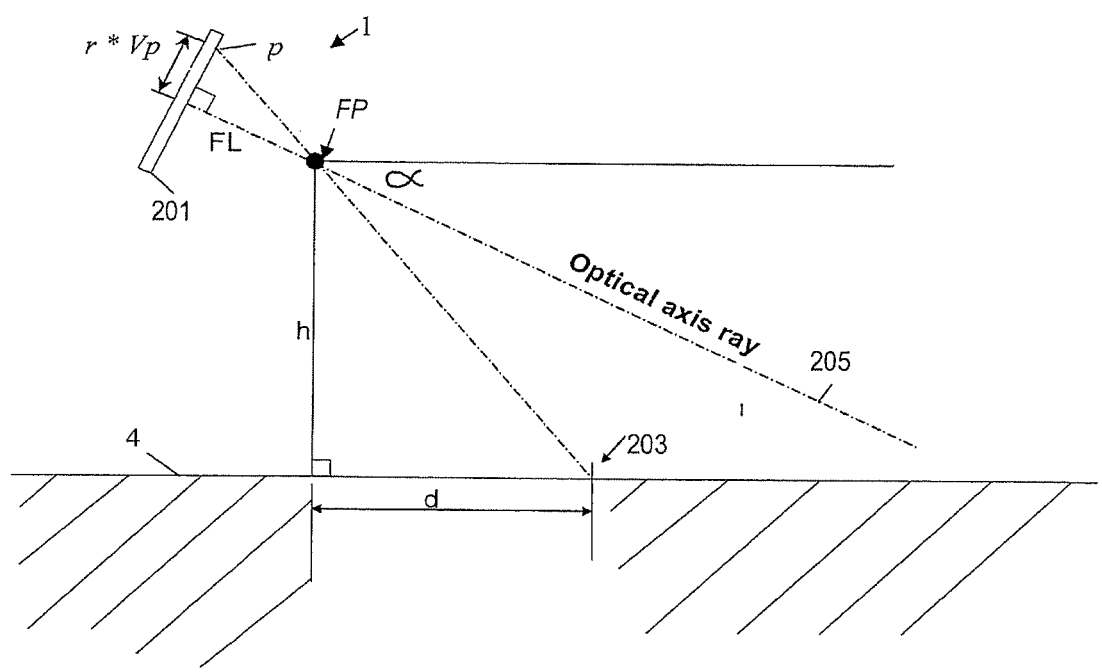
FIG. 4A shows an example side view of camera in relation to the road, illustrating the relationship between the image plane and the distance ahead on the road.

The sizes of real-world marking 8L, 8R and periodicity are converted to their equivalents 7L, 7R in the image plane 201 by knowledge of the camera focal length FL and height h of the camera to the road 4 (FIG. 4A). Specifically, a relation between the camera pitch angle α, camera height h, the on-the-ground distance ahead x=d, to a point 203 (P) on the road 4 ahead of the camera 1, the vertical pixel size Vp, the focal length FL, and an image row r (measured relative to the optical axis 205), in the image plane is described as:

$$\tan\left(\alpha - \tan^{-1}\left(\frac{h}{d}\right)\right) * \frac{FL}{Vp} = r. \tag{1}$$

Figure 4B:
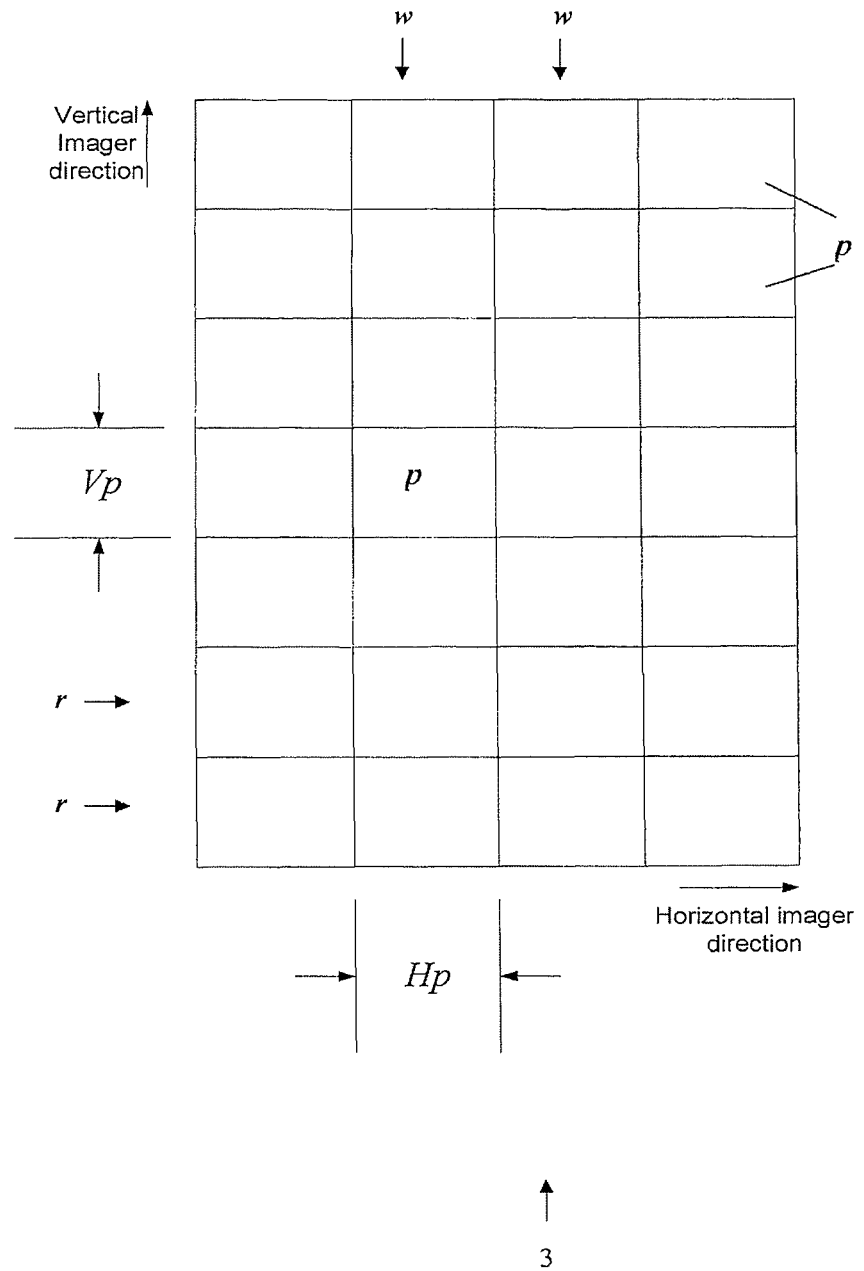
FIG. 4B shows an example of array of image pixels p, arranged in rows r and columns w, illustrating a vertical pixel size Vp and horizontal pixel size Hp, in a road image.

In addition, a pixel p in row r and column w (horizontal pixel size Hp and vertical pixel size Vp, FIG. 4B) projects to a lateral ground distance y (FIG. 3A) on the road ahead as:

$$w=(y*(FL^2+r^2*Vp^2)^{1/2}/Hp*(h^2+d^2)^{-1/2}), \tag{2}$$

or $$y=w*Hp*(h^2+d^2)^{1/2}/(FL^2+r^2*Vp^2)^{1/2}). \tag{3}$$

Column r and the lateral distance y are measured with relation to the optical axis of the camera or its vertical projection onto the road ahead. When the camera is installed with a static yaw in the vehicle, column r and the lateral distance y are measured with the relation to the lateral location of the straight road vanishing point.

Taking y as the minimum marking width, and knowing the distance of this marking, d is determined and then w is determined, which is then the number of pixels a minimum width marking subtends. The number of pixels varies with the distance ahead d, or its image plane equivalent, row r. The vertical and horizontal pixel sizes may be different.

With the size of the minimum width marking determined, expressed in pixels, smaller image features may be removed from consideration by filtering with the appropriate dimension in terms of pixels. Note that the size of a marking, measured in the number of pixels it covers, varies with the distance of that marking from the camera. With a different perspective distance (PD), the same size marking 8L or 8R covers fewer pixels in the image the further away it is from the camera, and more pixels the nearer it is. Expressed differently, the minimum marking size uses a shorter filter length for rows near the top of the image than for rows near the bottom of the image, etc. The filter length, computed from the minimum marking width, thus varies with the row location in the image. Higher rows, which are further away, use a smaller filter length than the rows nearby, even for the same width marking. The marking features in an image typically consist of pieces in each image row (e.g., one or more pixels in each image row), wherein the marking pieces from different image rows are assembled into whole markings and boundaries (7L, 7R) for each image.

Figure 5:
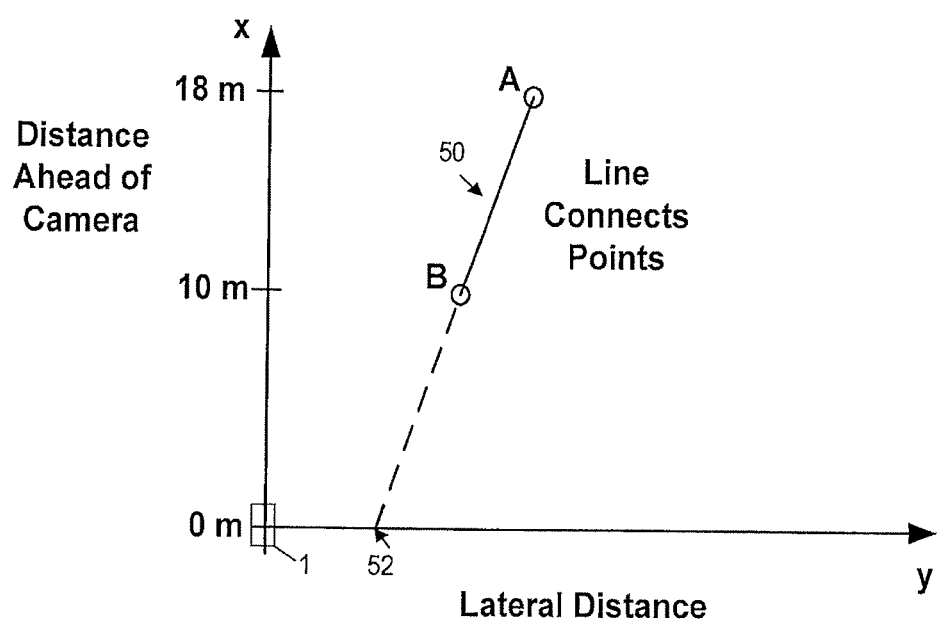
FIG. 5 shows an example of two points A and B in one of the collections, wherein point A is at a road location ahead of the camera and point B is at a road location ahead of the camera.

The camera produces images of road markings that are at a distance ahead of it. Curve fitting is used to determine the camera lateral location, in relation to the road markings, at zero distance ahead (so just to the right and left of where the camera is located). The above steps provide two collections of points P, one for 8L and one for 8R markings in the road plane, denoting each collection as $(x_i, y_i)$. FIG. 5 shows an example of two points A and B in one of the collections, wherein point A is at a road location 18 meters ahead of the camera 1 and point B is at a road location 10 meters ahead of the camera 1. A straight curve fit line 50 connecting the two points A and B is extended (extrapolated) back to a distance of zero meters from the camera located at the origin x=0, y=0 (zero distance). A such, points A and B on marking ahead of the camera are joined by a straight line 50, projecting back to the distance of the camera from the marking (at zero distance ahead, on the y-axis).

The example in FIG. 5 is a special case of a more general back projection, where more than two points P in each collection are available, and therefore a more sinuous (higher order) curve than a straight line (a first order curve) may be utilized. Many possibilities for this curve exist, but a parabola (second order) works well, accommodating curves. Specifically, a least-squares parabolic fit may be applied to a set of $P(x_i, y_i)$, and extrapolates the curve back to the camera, at zero distance, providing the lateral location 52 of the marking, relative to the y-axis of the camera. Separate extrapolations may be used for collections of points $P(x_i, y_i)$ for each of 8L and 8R. It is advantageous to select the nearest point in a collection (e.g., point B in FIG. 5) to be as close to the camera 1 as possible for a more accurate extrapolation.

As such, preferably the ROI in the image 3 (used for detecting marking pixels p that are geometrically transformed to road positions P), are as close to the bottom of image 3 as possible. A collection of detected marking pixels p in the image plane are geometrically transformed to points (locations) on the road plane, and a curve is fit to the points P, and extrapolated to the camera zero distance to determine lateral distance of the camera in relation to a marking on the road. As shown in FIG. 5, for example, the camera 1 may be significantly closer to a marking at zero distance (perhaps too close) than at further away.

In one example, the computed lateral distance to a detected marking is then compared to a distance threshold to determine if the camera is too close to the marking. The distance threshold is typically set so that the driver or a support system has time to react or and bring the vehicle back toward the center of the lane, away from the marking. Taking reaction time into consideration, then a warning may be invoked when:

time remaining to road marking crossing<time threshold.

Typical human reaction times are on the order of a second, which is also an approximate appropriate value for the time threshold.

In order to determine the time remaining to road marking or lane crossing (TLC), the distance remaining to the marking at image frame f is numerically differentiated over consecutive image frame, providing the camera speed toward the marking in frame f, as:

speed toward marking(f)=(distance(f)-distance(f-1))/time between frames.

In other words, the speed toward the marking equals the current distance minus the previous distance, divided by the time between measurements. Low-pass filtering may be applied to remove noise, as:

smoothed speed value(f)=F*smoothed speed value(f-1)+(1.0-F)*speed toward marking(f).

An example value for F may be about 0.8 or 0.9. The TLC(f) to a marking in frame f is determines as:

TLC(f)=distance to marking(f)/smoothed speed value(f).

The time-based warning or support rule can then be expressed as:

warn when TLC(f)<time threshold.

Other warning invocation rules may be used, such as giving a warning even when the vehicle has crossed the marking, as there is typically room left to return to the lane, and a warning is still useful. In general, the intent is to invoke a warning, as a timely aid to the driver in returning to the lane or road. This warning may be acoustic, but can also be haptic (felt), transmitted via a vibrating steering wheel, for example. The support is mechanical, actively steering or prompting the driver to steer, back into the lane. Other examples are possible.

A more natural feeling system results when curvature information from the curvature measurement module 12 is used to determine where warnings or support should be given. Many drivers "cut" the inside of curves with their vehicles, allowing them to drive straighter. The controller 5 allows for an amount of "cut" that is related to the curvature, with tighter curves allowing more "cut".

The type of road marking 8R, 8L influences the nature of the warning/support invoked. A stronger (e.g., louder, longer, more elaborate) warning/support may be provided when crossing double solid markings, for example, than when crossing a single, dashed line marking. A set of rules relates the marking type to the nature of the warning/support invoked. The type of marking is determined by checking how often (over time) and for how long (in a single image frame) marking features are detected.

The boundary detector 6 may use more elaborate detection for to provide better warning/support, by attempting to detect markings from information in a single image, using detected marking features in the same image (e.g., first using marking pieces with strongest contrast, and then the brightest marking pieces, etc). Further improvement may be achieved by detecting other road indicators in addition to lane markings, even in cases of low contrast (e.g., overcast daytime). For low contrast cases, the boundary detector 6 may detect differences in texture in the image (measured using mean absolute deviation). The plausibility of a marking detection in a current image frame is checked in terms of expected similarity and image position, to that of a marking detected in one or more prior image frames. The output of the boundary detection module, if a marking or boundary is detected, is location of the lane marking/boundary, in the image, assembled from the individual marking/boundary pieces.

The improved road marking detection scheme may execute in parallel with simpler detection schemes (e.g., Dickmanns, "An Integrated Spatio-Temporal Approach to Automatic Visual Guidance of Autonomous Vehicles", 1990), and may generally takes priority over such simpler schemes. Should the improved scheme find a road marking, then the output of simpler scheme may not be used.

Figure 6:
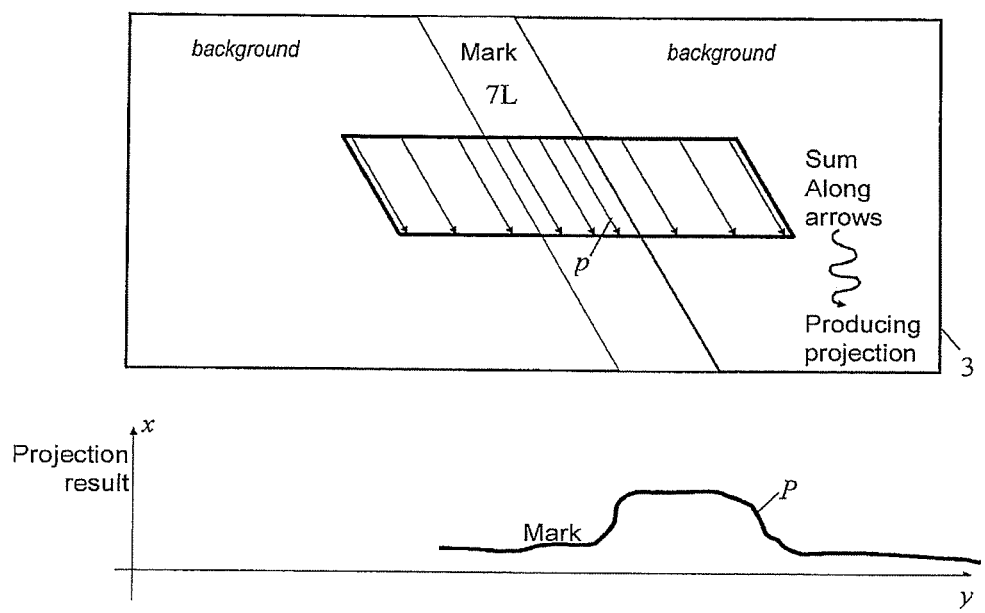
FIG. 6 shows the core of Dickmann's marking detection method.

One example scenario according to the invention involves the following. Starting from an expectation of where markings are in the image plane, and summing pixels p(r, w) in different rows in the expected direction of the marking 7L (FIG. 6), strengthens the signal representing road plane locations P(x, y) corresponding to the pixel positions. The process then involves finding the possible marking edges in the summed signal, from dark to light and light to dark, examining edge pairs (dark to light and light to dark) in this strengthened signal, checking their spacing (markings are lighter than the background and constrained in width). The number of edge pairs with the proper spacing (e.g., within a range) are counted, wherein the number edge pairs represents an approximation of the number of markings. When multiple markings are detected, the nearest marking is taken as the relevant one to measure the camera distance to.

Figure 7A:
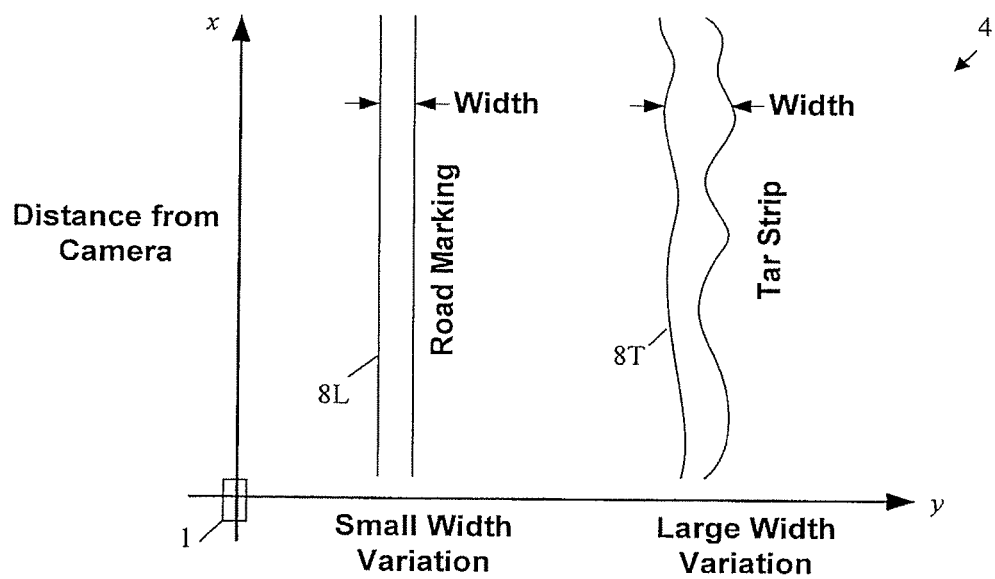
FIG. 7A shows a measure used for detection of tar strips on the road.
Figure 7B:
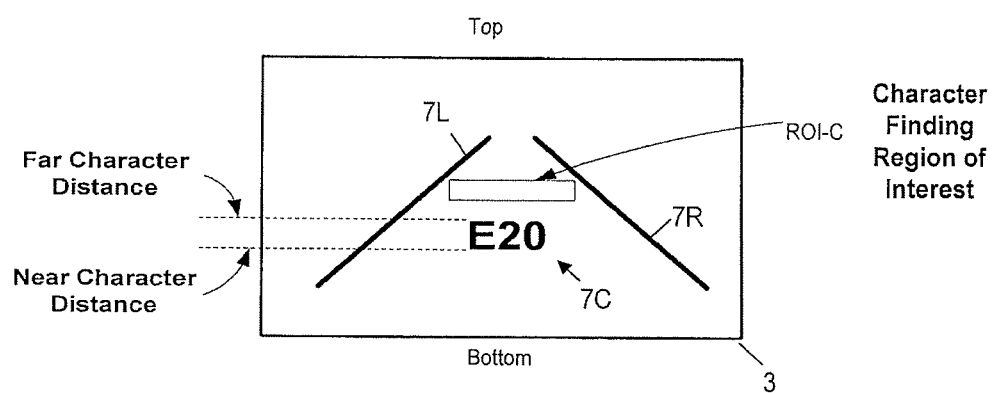
FIG. 7B shows the detection region for characters on the road and the near and far distances that describe their location.

The boundary detector 6 may further implement a process for rejecting image features that do not properly represent road markings. Referring to FIG. 7A, the most common is when a normally dark tar strip 8T becomes bright ("shines") in low angle sunlight, coming from ahead of the camera 1. A second cause is characters 7C (e.g., text, arrows, crosswalks) on the road (FIG. 7B), which are often parallel to the markings 7L, 7R and can appear similar. The boundary detector 6 detects, and removes from consideration, both shining tar strips 8T and characters 7C. The boundary detector 6 rejects tar strips as markings based on criteria indicating that tar strips 8T tend to be of more irregular width than lane markings (e.g. 8L). Further, tar strips 8T can only shine when there is bright sunshine ahead, from a bright scene, which can be detected.

By checking if the variation in width of a tar strip 8T is larger than a threshold, and measuring the overall scene brightness, the chance of mistakenly identifying tar strips 8T as lane markings (e.g. 8L), is reduced. The boundary detector 6 processes candidate lane marking image features (pixels) along with width and length measurements and image brightness. Based on the above criteria, the boundary detector 6 determines whether candidate pixels represents lane marking (e.g. 8L), or a tar strip 8T. Candidate lane markings that appear to be tar strips are not used further. Tar strips 8T usually have a larger width variation than lane markings, and as such tar strips 8T can be identified via this characteristic.

Characters 7C (FIG. 7B) are typically located between lane markings, and as such, a region of interest for character (RIO-C) is located therebetween. The presence of 7C is determined using ROI-C located near the top of 7C. This window RIO-C detects characters as they enter the RIO-C, moving downward from the top of the image, toward the bottom, as the vehicle moves forward. The characters 7C are tracked with a near and a far distance. All marking piece detections in the rows between the near and far distances are ignored.

Figure 8:
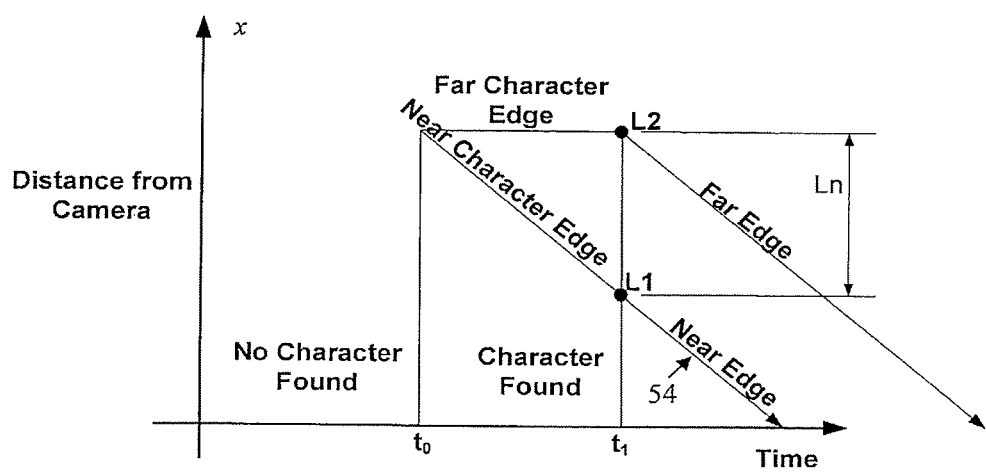
FIG. 8 shows the time behavior of near and far distances for detection of characters on the road.

As noted, once a character 7C has been detected in the region of interest, it is tracked. Referring to FIG. 8, tracking is performed via two quantities, one indicating where the character starts (relative to the camera, its near edge) and another describing where it stops (further from the camera, its far edge). These two quantities are necessary because characters may have significant length. In the next image frame, the detected character will have moved closer to the vehicle, by a distance equal to the video frame time multiplied by the vehicle speed. The character may extend further away from the vehicle (a long arrow, for example, does this), and so continues to be detected in the character finding region of interest. As long the character continues to be detected there, the character top (far distance) is maintained at the character window distance, decreasing the near distance by the video frame time multiplied by the vehicle speed. Once a character is no longer detected in the character window RIO-C, the far distance also decreases by this amount for each frame.

In FIG. 8, a character is first detected at time t0, covering more length as it enters the analysis area ROI-C, finally showing its full length (Ln=L2-L1) at t1. The near edge always moves toward the vehicle; the far edge only moves toward the vehicle when the end of the character is finally seen, at t1. The slope of the line 54 corresponds to the vehicle speed. All detections of possible marking pieces in the rows between the character near and far distance are ignored.

The prediction functionality of the Kalman filter generally allows "false friend" markings to be removed without compromising the ability to warn the driver if too close to a marking (since the Kalman prediction can fill in the gaps and produces a useful output signal, even without a real measurement being available for a number of frames, this possibly due to removal of marking pieces).

The boundary detector 6 may further reject detections in the gaps between dashed markings. Marking pieces found in the image must match the dashed marking model to be accepted as true marking pieces. Uncertainty in dash location is allowed. Dashed markings comprise short marking segments interspersed with gaps. The regularity of the dash and gap pattern can be learned, and then used to reject apparent marking pieces located in the gaps. The process involves repeatedly overlaying the dash-gap patterns from multiple image frames over each other, based on vehicle speed information, thereby strengthening the pattern for learning the dash-gap cycle. Based on the vehicle speed and the expected location of dashes, image feature detections between the gaps in the images are discarded.

The discarding process is performed by predicting where the dashes and gaps will be, one frame ahead, and only using marking pieces where they are expected to be (with some uncertainty). The result is a cleaned-up set of probable dashed marking pieces, which are then more reliably assembled into the true dashed marking pattern. Candidate marking piece removal in gaps is only applied when a dashed marking pattern is detected, seen from the periodic absence and reappearance of markings over time.

Figure 9:
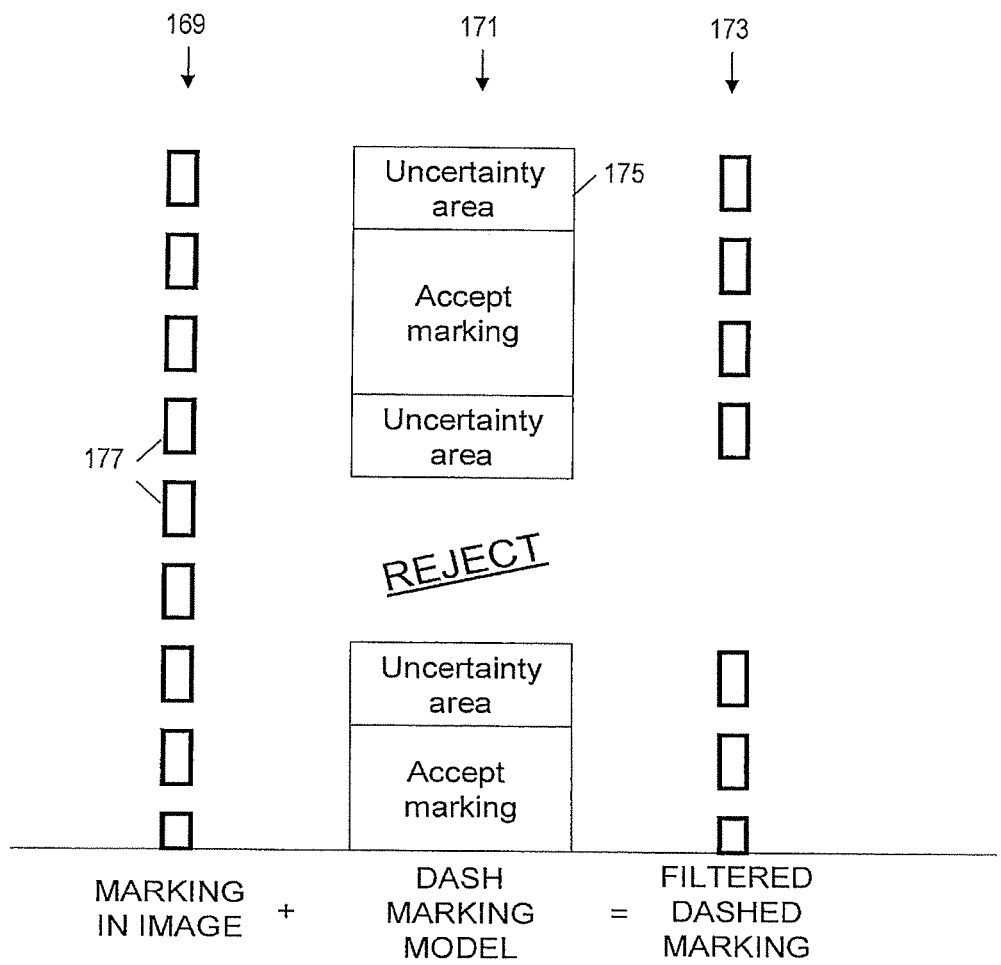
FIG. 9 shows an example of dash-gap marking model application for marking piece detection.

An example application of the dash-gap prediction (model) is shown in FIG. 9, wherein an incoming marking configuration 169 from the image, shown on the left, passes through a filter 171, shown in the center, to generate filtered dashed markings 173, shown on the right. The blocks 177 represent the actual dashed marking pieces found on the road, some of which may be noise. Using the filtering process, marking-like objects in the image that are in the gaps between dashes, and their uncertainty areas 175, are not used to construct road markings (are not used for curve fitting) from the image. Marking candidates located in the gaps between dashes are rejected, allowing for a certain level of uncertainty 175 in accepting road markings (e.g., such uncertainty may be 0.5 meters at the ends of each expected dashed marking location, accepting marking pieces found there).

The boundary detector 6 may further predict the ROI in the next image frame. This is achieved by using default large ROI of the image, within which markings are detected. With large regions, it is possible to detect objects that appear to be lane markings, but are not. By shrinking the ROI size, and placing the ROI where the markings are expected to be based on prior detections, the incidence of false marking detections can be reduced. To predict the location of an ROI for the next image frame, the recent past marking detections are used to predict the location of such measurements in the next image frame. This may be achieved using Kalman filtering, but simpler schemes, such as alpha-beta filtering can also be used. The state variables for a Kalman filter are the zeroth, first and second order coefficients of a parabola that best fits the road-plane data, wherein:

Lateral distance $y$=zeroth order term+first order term*distance ahead+second order term*distance ahead*distance ahead.

Kalman filtering generates: a number of smoothed measurements, a prediction for location of a marking in a next image, and an estimate of the uncertainty in the prediction. The width of ROI is sized proportionally to the uncertainty, but maintained at least 4 minimum marking widths at all time. With the ROI shrunk to $1/10^{th}$ of its original width, the possibility of false detections is significantly reduced, along with a lowered computation time.

Figure 10:
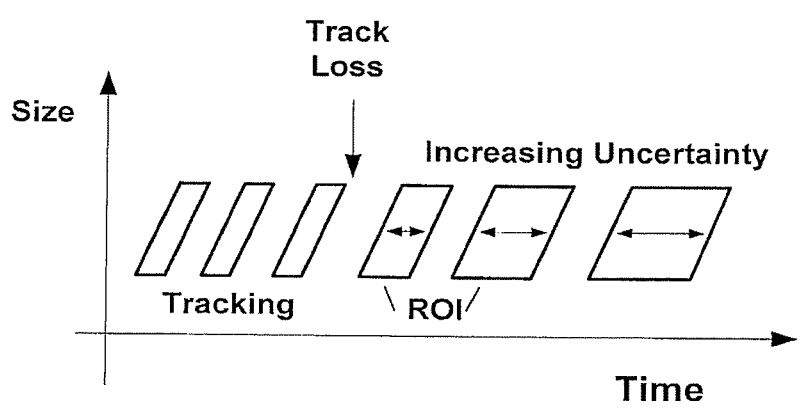
FIG. 10 shows an example of the expansion of the ROI lateral size due to increasing detection uncertainty.

When there is no measurement available in a given image frame for the location of a lane marking or boundary, then Kalman predictions are used instead. The predictions become more uncertain when the measurements remain unavailable, whereby the system expands the ROI as shown by example in FIG. 10. The width of the region of interest expands when tracking is lost, representing the increasing uncertainty in the prediction of the marking location. The width of the region of interest is limited to a maximum value, for reasons of computation time and because lanes cannot become wider than approximately 6 meters. The length of the region of interest is not adjusted.

The predictions are made in the plane of the road, since the Kalman state variables are in the plane of the road. The road to image geometrical transformations presented above are used to convert the predicted marking location on the road into an image location. The regions of interest are placed symmetrically about the predicted boundary location in the image 3. If, for a critical number of consecutive frames, predicted marking locations are used in lieu of real marking location measurements (the system functions 'blind'), the system reverts to the maximum region of interest width again. This blind state is monitored with two blind state quantities, the first being how many frames have passed since the last real measurement was available, and the second how much distance (accumulated vehicle speed times frame time) has passed since the last measurement was available. When either of the two quantities reaches a critical limit, the region of interest is reset to its maximum width. A typical value for a critical blindly traveled distance is approximately 20 meters, assuming a typical highway driving speed.

The Kalman filter is only started when there is reasonable certainty that the system has consistently been detecting the same marking. This is performed by checking a series of consecutive image frames and verifying marking detections in at least a certain percentage of them (typically, more than 60%). Data is sent to the Kalman filter at three distances (e.g., located at approximately 6, 9 and 12 meters ahead of the camera). These distances are also where the Dickmann's type marking finders are placed (used primarily for counting the number of markings). When an acceptable marking has been found, the location of the marking at the three distances is computed, producing up to three (row, column) pixel positions in the image. Said pixels are the inputs to the Kalman filter. Less than three pixel positions may be generated when a detected marking is too short to cover all three distances.

To determine whether a track (a coherent marking or boundary that can be followed) is starting, a marking must be detected, frequently enough, approximately where it is expected in the image. When a detection is identified in at least one location, the system begins tracking at that location, starting the Kalman filter. The first phase of tracking is a confirmation interval, which is typically e.g. 15 meters traveled. The track is not used for warning or control, until it is confirmed as a valid track at the end of the confirmation interval. During this phase, the system investigates the area of the road in the image in the predicted path from the first detection. The system accumulates additional detections in each of said three detection location pixels. During the confirmation interval, the system accumulates a minimum number of detections in each of the three detection pixel locations. This minimum is typically the number of detections that would be seen when traveling past a three meter long marking at the current speed of the vehicle.

During the confirmation interval, the marking position must remain beyond the vehicle outer edge. At the end of the track confirmation interval, if both of said conditions are satisfied (i.e., a marking has been detected often enough and where it was expected in consecutive image frames) and the blind state quantities (distance and time) are not exceeded, the system continues to track the marking, and invocation of warning/support is enabled for that marking. If one of the blind state quantities is too large, the system discontinues trying to track the marking and returns to search mode for that marking.

While tracking a marking, the system maintains a history of the detections at each location for a recent traveled distance. The length of the history interval is typically 18 meters traveled. At each frame time, if there are no detections in a frame or if the total of detections at all of said three distances within the history interval is less than a limit, the track is considered to be not found and the blind stretch is incremented. When the blind stretch exceeds a threshold, the system discontinues trying to track this marking and returns to search mode for that marking As such, using a Kalman filter allows prediction of where to look in the image for markings, provides an estimate of how large the image evaluation area should be, provides a smoothed output signal, and a provides well-characterized and provably optimal mechanism for making the best of raw input signals.

Many circumstances can make finding lane markings or road boundaries difficult. The boundary detector 6 recognizes such difficult circumstances and improves system performance in them. Clutter in a road image may result in detection too many image feature signals, which may make choosing the right one difficult, particularly if two of them are very similar (e.g. nearly equally strong, near where they are predicted to be, of similar character, etc.). A second difficulty may occur when signals suddenly become too weak to follow. A special, third, difficulty, is falling snow that appears to be pieces of markings, and should be eliminated from consideration in detecting road markings. Fourth, from-the-road reflections appear a markings, since reflection may be appear as long, white stripes on the road. As such, such reflections should be identified and eliminated from consideration in detection road markings.

Figure 11:
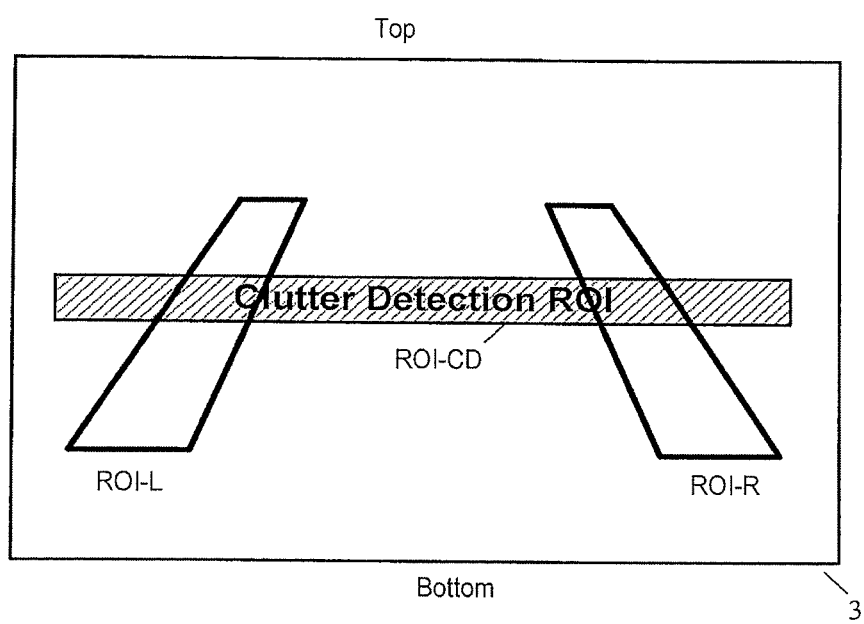
FIG. 11 shows the region of interest used for clutter detection in a road image.

In order to process cluttered images, a clutter detection process involves placing a special region of interest (ROI-CD) at approximately the midpoint of the near and far detection distances (bottom and top of image, respectively), covering the image width, as shown in FIG. 11. The data from the region of interest ROI-CD is fed to a Dickmann's type of marking finder, to provide the location of the current markings and possibly-present additional markings at each frame. Such output is used to detect clutter (confusing signals) and persistent, alternate, nearer tracks that should be switched to. Said additional markings may confuse the system. Too many of them, in varying locations, especially only intermittently, cannot form a clear signal or track to follow. An example of this might be marking piece detections that are only occasionally present (not persistent enough to provide a plausible detection signal) or marking piece detections that are randomly present (not near enough to each other to provide a coherent detection signal).

As such, the boundary detector 6 checks detection signal from the ROI-CD special region of interest, and evaluates at least one or more of the following clutter quantities in detecting clutter: number of marking detection signals are present, but that are not being currently tracked, which may confuse tracking; the timing frequency of the detection signals (e.g., occasionally present, but too intermittent to form a valid track, or too infrequent, etc.); variation in location of image features generating the detection signals (a large variation impedes a valid track). A clutter detecting function of the boundary detector 6 looks for the presence of such signals that might confuse the system and ignores all detections when confusion and hence mis-tracking may result. Based on evaluation of the above clutter quantities, the lane boundary detector 6 processes at least one or more of processes the following types of marking detection signals:

Detection signals to track, without presence of clutter detection signals.

Detection signals to track, with presence of clutter detection signal which do not provide a valid track.

Detection signals to track, with presence of other detection signals that do form a valid track but such valid track is not as near to the camera laterally as the current one (alternate track that the system should not switch to for warning invocation).

Detection signals to tack, with presence of other detection signal that do form a valid track, and this valid track is nearer the camera than the current one (alternate track that system should switch to for warning invocation.)

Further, a tracking function of the boundary detector 6 detects situations when making signal strength in images may suddenly drop, such as in dark shadows, and other, incorrect, signals may be taken instead. For example, the boundary detector 6 checks for particularly dark image areas (dark patches), using brightness histograms of such image areas, and in consecutive image frames determines that such dark patches approach with the speed of the vehicle, indicates stationary areas on the road. Before the vehicle entering such stationary dark areas (e.g., stationary shadows), the boundary detector 6 compensates for temporary loss or weakness of marking features in the image (detection signals). As such, upon the vehicle entering such stationary dark areas, the boundary detector 6 checks when the corresponding dark image patch reduces in size, thereby expecting a potentially sudden reappearance of the detection signal to compensate for. This allows the lane departure detector 9 avoid false invocation of warning/support associated with entry into and exit from such dark locations.

The tracking windows are made more narrow when in dark locations, so reducing the probability of incorrect detections, and new tracks cannot start. The processing of dark image patches also depends on the image resolution camera (imager) type. High dynamic range cameras, which can resolve contrast in dark regions, allow the boundary detector 6 to process dark shadows with more resolution. A parameterization of the lens-imager-vehicle lighting system may be utilized for determining exactly what a dark region is.

When precipitation, such as snow, is present in the scene, image features corresponding to such precipitation should be removed from consideration by the boundary detector 6 and the lane departure detector 9. Falling snow, being white flakes that appear similar to marking pieces, may generate disconnected marking piece detection signals which can be measured with a connectedness analysis. Generally falling snow occurs during sufficiently cold temperatures which can be measured. When cold temperatures are detected, the system can remove these stray 'marking pieces' without connection to one another, particularly when the disconnectedness persists.

Figure 12:
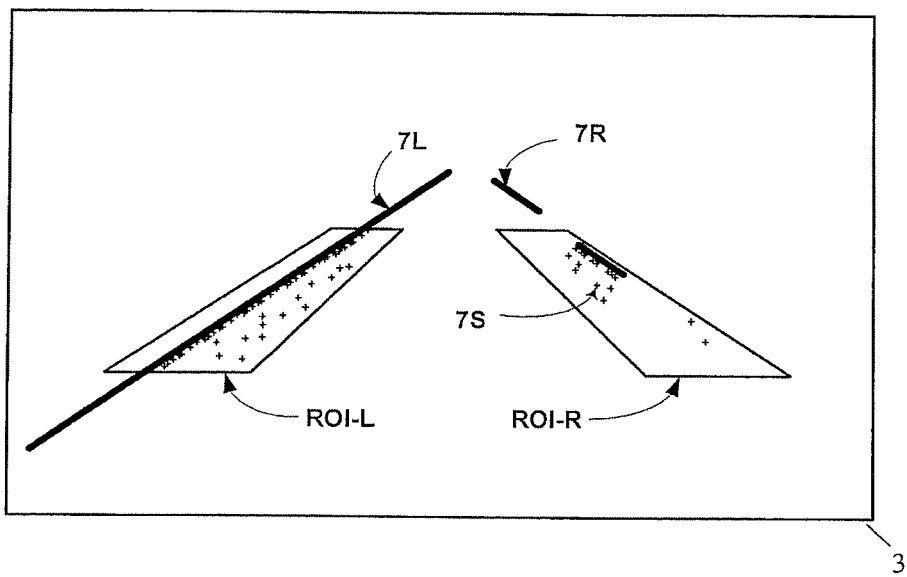
FIG. 12 shows an example of precipitation detection in a road image.

FIG. 12 shows an example of how marking pieces 7S ("+" symbols) agglomerate near markings, dashed or continuous. 7L, 7R and are isolated from each other otherwise. The boundary detector 6 functionality removes from marking piece detection single, isolated pixels that were identified as possible marking pieces but probably are actually falling snowflakes. The proper identification of dashed and continuous markings is thereby favored, improving detection.

Figure 13:
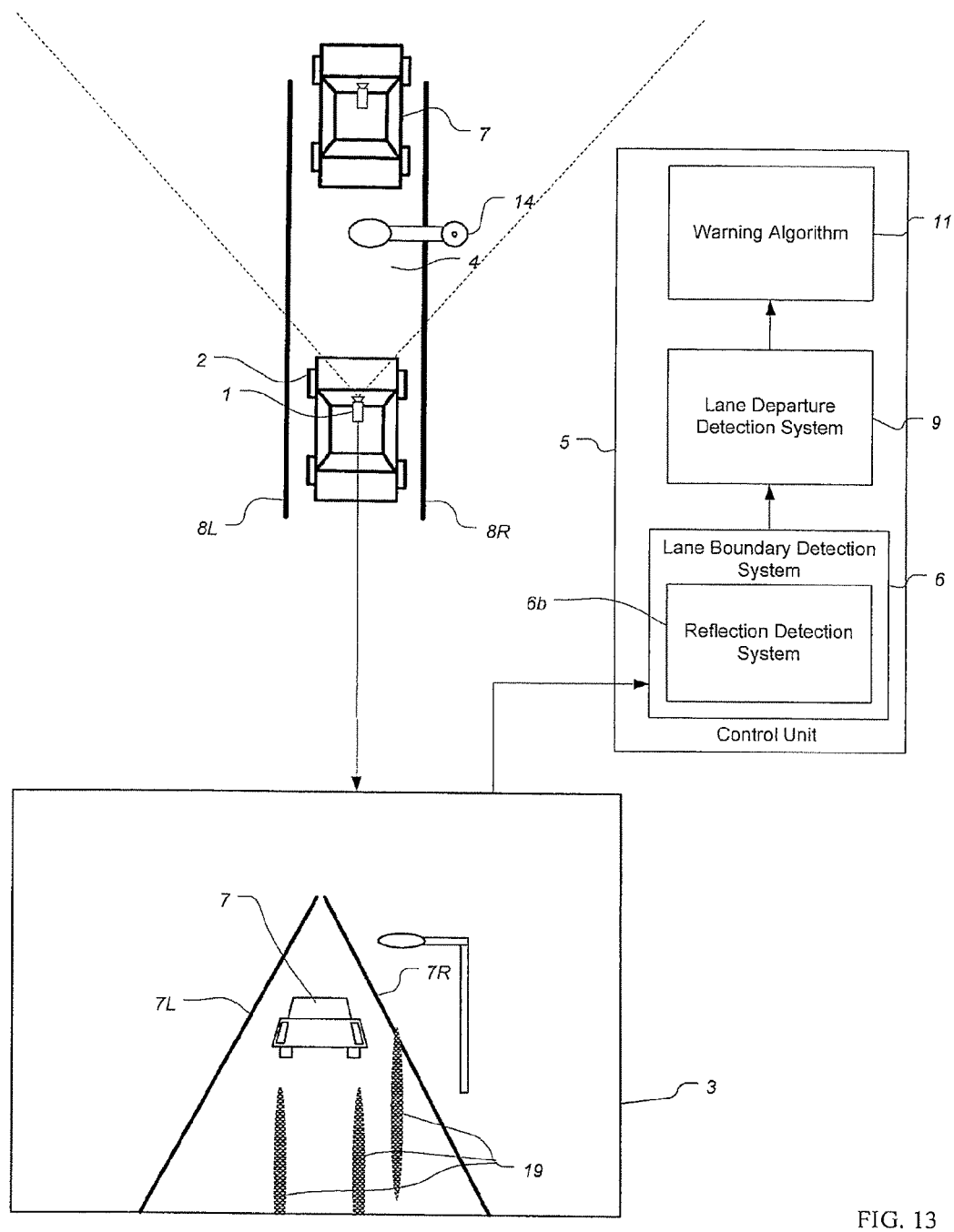
FIG. 13 shows an example of reflection detection in a road image.

Referring to the embodiment of controller 5 in FIG. 13, the boundary detector 6 includes a reflection detection function 6b which eliminates image features representing road surface reflections 19, from consideration in marking detection (FIG. 13 also shows a lamp post 14 and another vehicle 7 on the road 4 ahead of vehicle 2 on which camera 1 is installed). As noted, such reflections 19 which can appear as bright, marking-like vertical stripes can confuse a lane marking finding system. The reflection detection function 6b checks the image 3 for strong, vertical, dark to light to dark pixel luminance patterns 19, as possible reflections. The reflection detection function 6b also checks the length and width of these high contrast pixel patterns 19, rejecting too wide or too short patterns. The reflection detection function 6b identifies portions of the image that should not be used for marking (e.g., 19) detection analysis. These may be conveniently stored by their image column location only, as reflections are mostly vertical, but single pixels tagged as reflections may also be bypassed.

The controller 5 (boundary detector 6 and lane departure detector 9) further determines where there is a new or more relevant road marking to track (follow), such as when there are two or more markings detected in an image frame. For example, when a road marking is detected more frequently then the road marking being currently tracked, the controller 5 determines which markings to track. Generally, the innermost (nearest) marking, relative to the camera, is the one that defines a lane. If the controller 5 detects a road marking nearer than the currently tracked markings, the controller 5 may switch to tracking the nearer work markings. Switching to tracking different marking may also be necessary when, for example, a new marking has been added to replace an older, faded one being currently tracked, etc.

In one example, the controller 5 switches from tracking an existing (current) marking to tracking a new marking when all of the following conditions exist: the controller 5 is currently following a marking, and cluttering detection signals are minimal, the new marking has been detected in a sufficient number of image frames, and the ROI does not include multiple markings or the ROI includes multiple marking and the new marking is closer to the camera, and the new marking has been detected for at least a certain distance traveled (e.g., 15 meters) or the existing marking has not been detected for said distance, and the new marking is detected more frequently over said distance than the existing marking, and the new marking is not too close to the camera (which might lead to a false positive warning), and the lane width corresponding to the new marking is plausible. Other track switching examples involving combinations of more or less of the conditions above (or other conditions) are also possible.

Figure 14A:
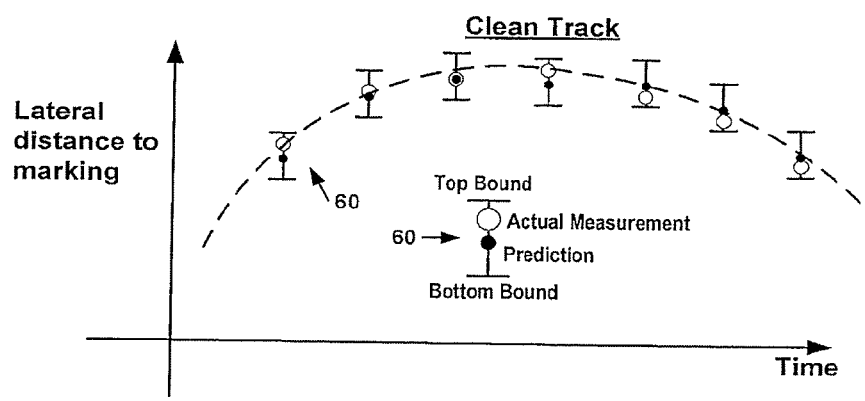
FIGS. 14A-B shows examples of tracking markings.
Figure 14B:
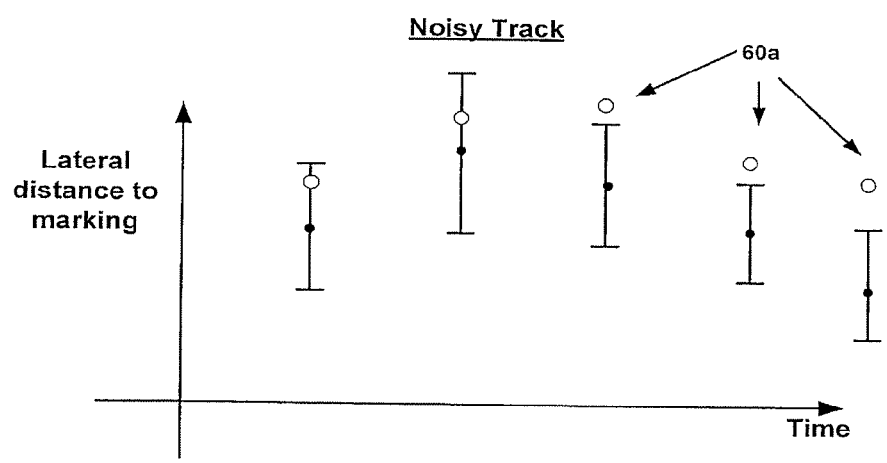

It is also possible that what appears to be a new marking is indeed a noisy current marking. As noted, noisy or missing markings may generate a large uncertainty for the predicted location of a marking in the next image frame. This area of uncertainty is termed the acceptance region, or gate. FIGS. 14A-B show two example cases of tracking marking detected in consecutive image frames. The first case in FIG. 14A represents a detection signal (corresponding to marking candidate pixels p) for a clean track, where seizes of gates 60 (each gate for an image frame) are relatively small and the actual measurements are near the predictions. The second case in FIG. 14B represents a noisy track, where the gate sizes are larger, and the measurements only stay within the gates for the first two frames (actual measurements for three frames are outside the gates 60a centered on predictions). When the measurement is consistently outside the gate, a new track may be starting, and the above switching may be invoked. Short episodes of a measurement being outside the gate or no marking (measurement) being present, are handled by using the predicted measurement instead.

The lane departure detector 9 further determines that leaving (or crossing) a road marking may be of certain consequence, which in certain instances may be of more import than other instances. In one example, three parameters are used to determine if leaving a road marking is of import. The parameters, detected from the road image, include: the number of road markings, the type of road markings, and a classification of what is seen beyond the road marking. A marking that signifies it should not be crossed (e.g., a double, solid, possibly yellow, line) may dictate a stronger warning than crossing a dashed, single line. An area beyond the marking in the image, which includes multiple vertical edges may dictate a stronger warning against entry. The three parameters modulate the warning or support given to the driver.

The type of road marking may be determined by detecting the marking length in a single image frame. Marking length is a fundamental quantity in deciding what type of a marking. Continuous markings have generally long lengths, while dashes have shorter lengths, and Bott's dots have very short lengths. Markings are found using an assembly process (connecting marking pieces with a fitting line or curve). Markings comprise of mostly connected pieces that are possibly interspersed with gaps (e.g., where no marking pieces are present). By detecting mostly connected pieces, and describing gaps in terms of a minimum length, the nearest and furthest distances of such assemblies from the camera can be determined.

Figure 15:
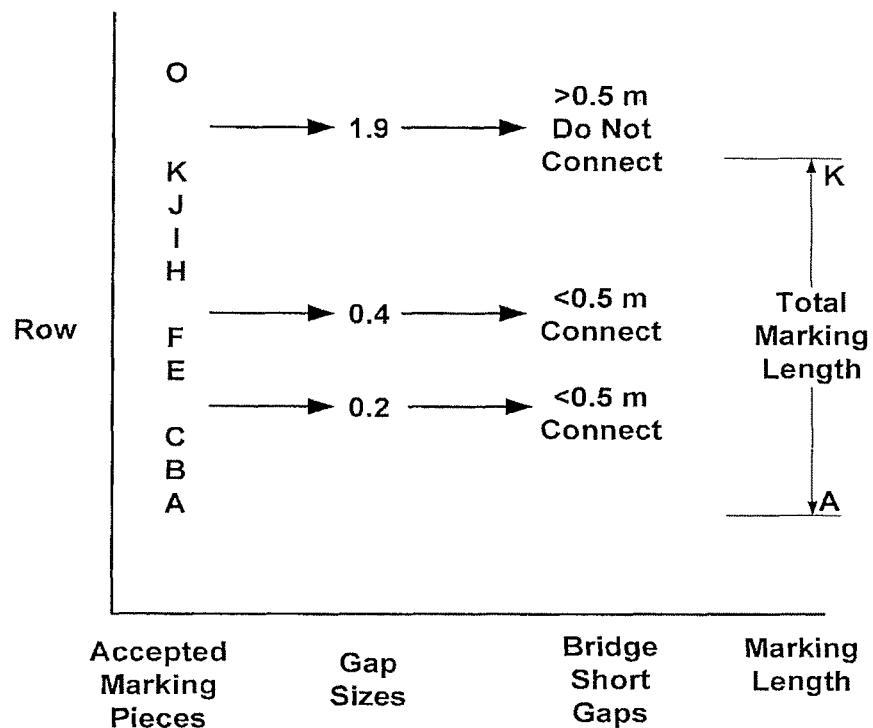
FIG. 15 shows an example of the marking length detection method.

The gaps between dashed markings are e.g. at least 2 meters in length. The gaps (holes) in a continuous marking are typically shorter, covering approximately e.g. 0.5 meters at most. Gaps comprise one or more image rows without marking pieces that contribute to forming a marking. Each row in the image 3 covers a certain length or footprint on the ground 4, which can be calculated from the camera geometry (mounting height, pitch angle, etc.) using said geometrical transformations discussed above. Referring to FIG. 15 in one example, by examining a list of the rows containing the marking pieces that were used to form a marking, the marking length can be found. The marking length is measured by summing the individual pixel footprints that make the marking. Gaps of up to e.g. 0.5 meters are allowed while anything longer is a gap between markings.

FIG. 15 shows a sequence of image rows denoted as A, B, C, E, F, H, I, J, K, O. The immediately adjacent rows A, B, and C have a marking piece in them. The next row, row D, does not have a marking piece present (gap). This is followed by rows E and F, which have marking pieces in them. Another gap follows, at row G. Finally rows H, I, J, and K have marking piece in them, followed by the next marking piece in row O.

The rows D, G, L, M, N lacking marking pieces are examined for road length each row pixel in them covers (corresponds to). For example, row D covers 0.2 meters, row G covers 0.4 meters, and that rows L, M, and N cover 1.9 meters together. The length of row D and row G is less than the critical 0.5 meters, while the length of rows L, M, and N together is more than the critical 0.5 meters. The marking therefore extends from the bottom of row A to the top of row K, and the length is the sum of the individual footprints of pixels A through K on the road. Rows D and G, being shorter than the critical maximum gap value of 0.5 meters, are incorporated into the marking, connecting the pixels next to them together. All rows for a region of interest are processed, detecting the presence of marking pieces, and the above steps are applied to find the length (and start and end) of markings.

Once the marking length has been measured, a classifier function of the boundary detector 6 determines the type of marking just measured. The classifier is rule-based, taking marking lengths as its input and generating marking types as output. For example, there can be four marking types: type 0=no marking, type 1=Bott's dots, type 2=dashed markings, and type 3=continuous markings. Example marking type classification rules may include If marking length=0, then marking type=0.

If marking length<0.5 meters, then marking type=1.

If marking length>0.5 meters and <3 meters, then marking type=2.

If marking length>3 meters, then marking type=3.

Figure 16:
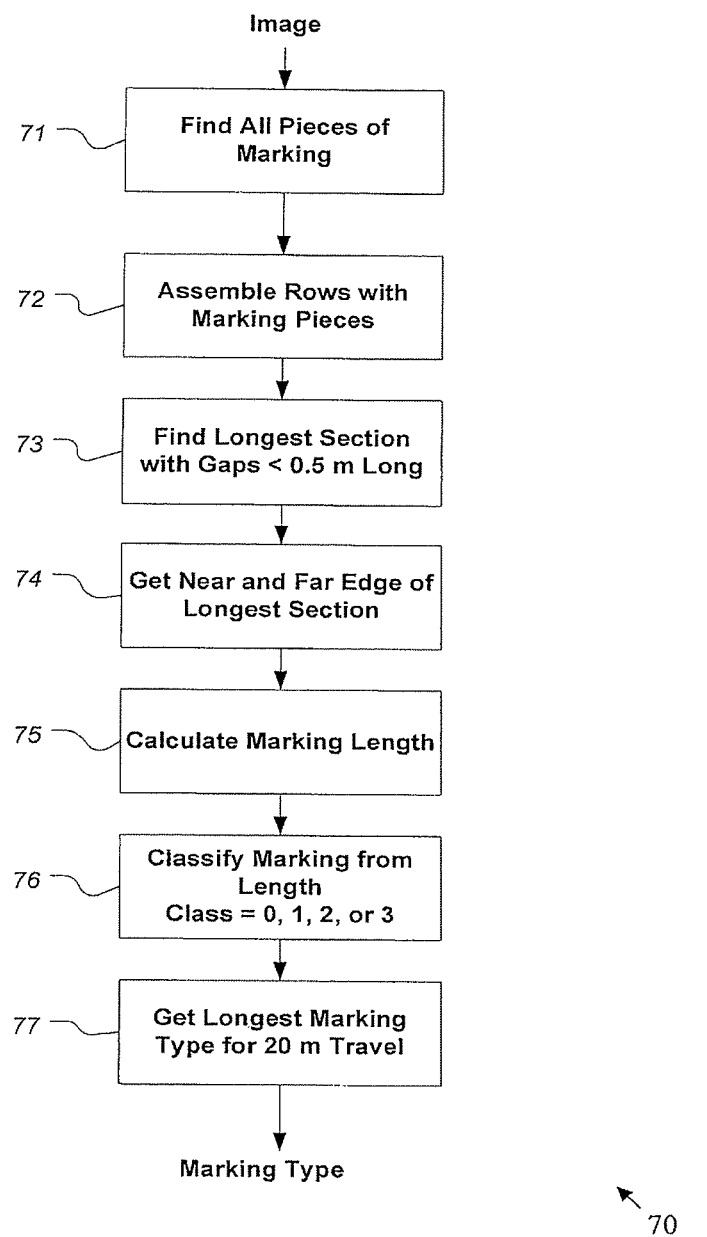
FIG. 16 shows an example single frame marking length measurement process.

These classifications of marking type may be noisy due to markings not being entirely visible or within the ROI, and may appear shorter than their actual lengths. For this reason, a filtering process is applied to the marking type classifications obtained during the last e.g. 20 meters of travel, finding their maximum, providing final, single frame, marking type classification. For example, even if only one solid marking classification (e.g., class=3) is detected in the last 20 meters, the marking type classified as solid marking. FIG. 16 shows an example single frame marking length measurement process 70, including the following steps:

Step 71: Find all pieces of a marking in ROI.

Step 72: Assembling a list of all rows with marking pieces present.

Step 73: Finding longest connected section, e.g., allowing for gaps<0.5 meters long.

Step 74: Obtaining near and far edge of longest section.

Step 75: Calculating marking length as the difference between the far edge location and the near edge location.

Step 76: Classifying marking types using marking length, into four classes, for example: class 0=no marking, class 1=Bott's dots, class 2=dashed markings, class 3=continuous/solid markings Step 77: Return the maximum marking class (0, 1, 2 or 3) found during the last e.g. 20 meters traveled, to provide the final marking type.

An alternative method for determining marking type is to determine how often a marking is detected over time. Smaller regions of interest are sectioned out from the usual larger one ROI-L or ROI-R, and marking detection is performed with the section out regions. In one example, infrequent detection (~%) of a marking correlates with Bott's dots, more frequent detection (15%) correlates with dashed markings, and yet more frequent detection (60%) correlates with solid markings.

Figure 17:
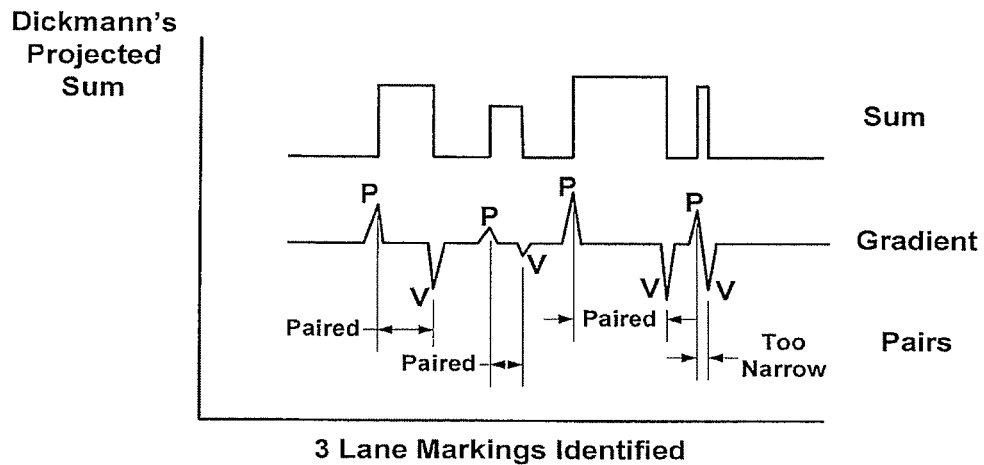
FIG. 17 shows a Dickmann's type marking finder applied to counting the number of markings.
Figure 17:
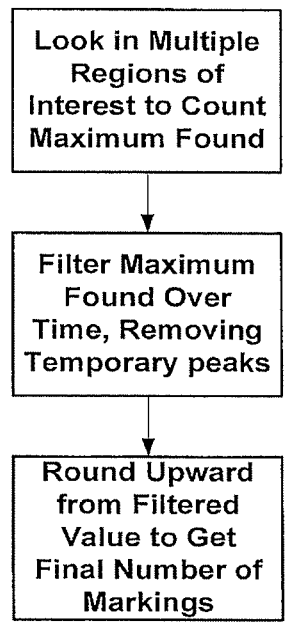

Multiple markings are generally a combination of dashes and solid stripes. These combinations may be detected by a Dickmann's type marking finder, where pixel values from multiple image rows are summed together as shown by example in FIG. 17, to detect a marking, utilizing the strengthened detection signal, with less noise due to the summing. The summed pixel values are processed to determine luminance gradients that exceed a threshold magnitude (e.g., 1 to 255 and preferably 6 to 24). Gradient peaks (gradient maximums) and valleys (gradient minimums) are then determined, and locations of a peak and an adjacent valley are examined for the spacing therebetween. When the spacing is between the minimum and maximum spacing values (e.g., measured in centimeters, 1 to 100, and preferably 7 to 70 cm, where in the centimeter sizes are converted into pixels before use) allowed for an image row, the peak and valley are paired (peak-valley pair or P-V pair, FIG. 17), as representing a marking. The number of paired peak-valley gradients is then the number of markings present in an ROI in the image 3.

Figure 18:
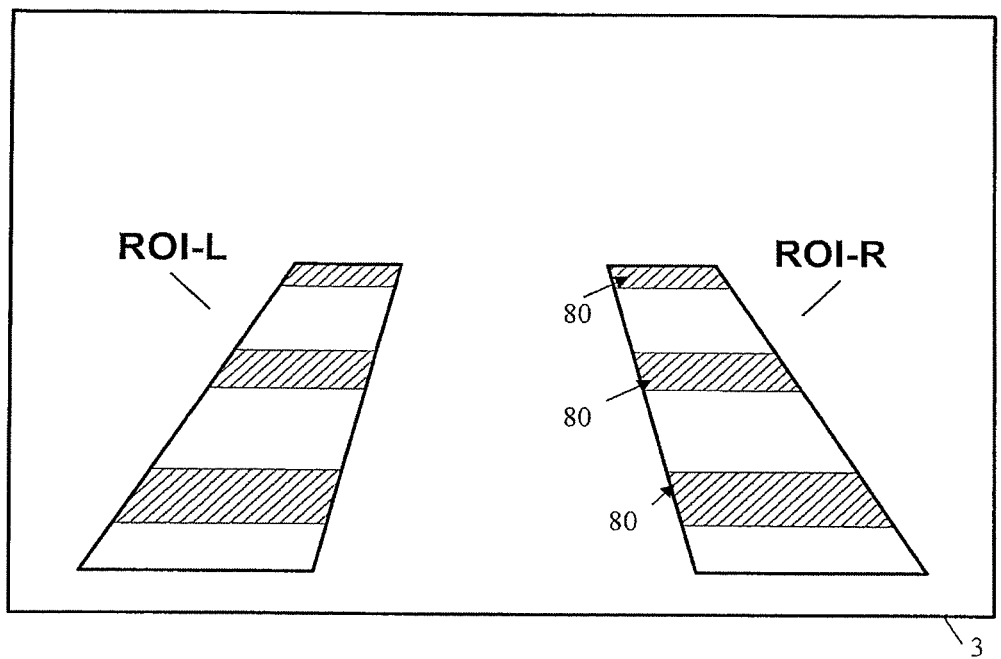
FIG. 18 shows an example placement of marking finders for determining the type of markings.

Applying marking detection using multiple Dickmann's type marking finders at different distances, but on the same side of the camera, multiple measurements for the number of markings present are made. Referring to FIG. 18, in one example, three marking finders 80 per camera side (ROI) are used, each covering approximately one meter longitudinally on the ground. A marking finder 80 may detect a gap between markings (e.g., a gap between dashes in a dashed marking) on one side of the camera (e.g., in image region ROI-R), and generate a lower number of markings than the other marking. The maximum of the number of markings found is taken as representing the number of markings present on that side in the given image 3.

It is possible that stray local gradients result in marking detections. As such, the number of detected markings is filtered over time. Referring back to FIG. 17, in one example, the maximum number of markings detected (P-V pairs) in a given frame is filtered, wherein the number of frames equivalent to e.g. approximately 20 meters of vehicle travel is used as the filter length. The filter averages the number of detected markings and generates a final detect marking count.

Figure 19:
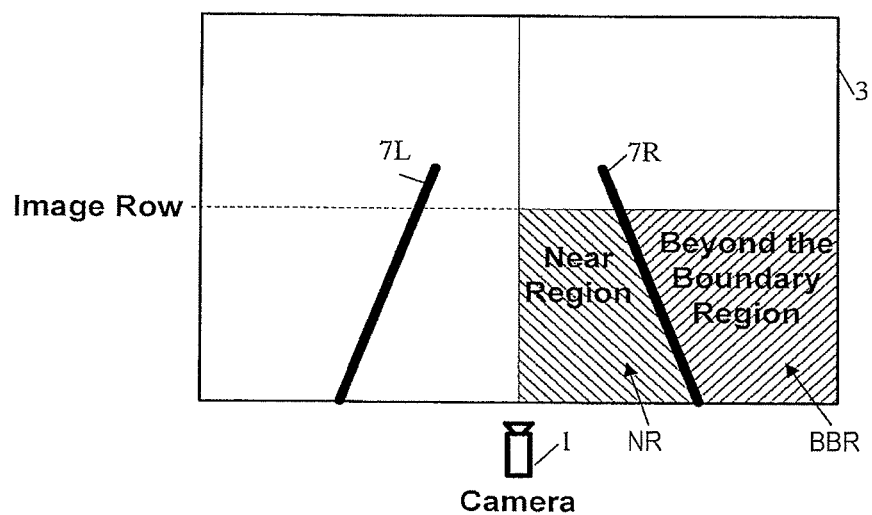
FIG. 19 shows example of characterizing image regions.

In addition to detecting road marking as described, image features before and beyond a road marking 7L, 7R or may be compared and characterized as shown by example in FIG. 19. The various quantities used to find the road marking are used as inputs, or features, for comparison and characterization. FIG. 19 shows two image regions NR and BBR, wherein region NR is near the camera and the region BBR is beyond an identified road marking 7L.

Regions of an image may be characterized by a number of characteristics. These characteristics can include average brightness, size, presence of edges, etc. In one example, the presence of edges in image regions NR and BBR is determined by measuring the image texture in the regions, to determine the features represented by the regions. Marking finders calculate, among other quantities, the pixel luminance gradients in an image row. Certain gradients may be significant when larger than a threshold (e.g., 1 to 255, and preferably 6 to 24). The spacing between these significant gradients (peaks and valleys) qualifies or disqualifies the area between them as a possible marking piece. The density and median spacing of these significant gradients in image regions NR and BBR, that are not otherwise identified as lane marking or boundary pieces, can serve as characteristics for classifying what is beyond/before a marking 7L. In one example, the density is measured as significant gradients per lateral meter. The median spacing is measured in columns.

Figure 20A:
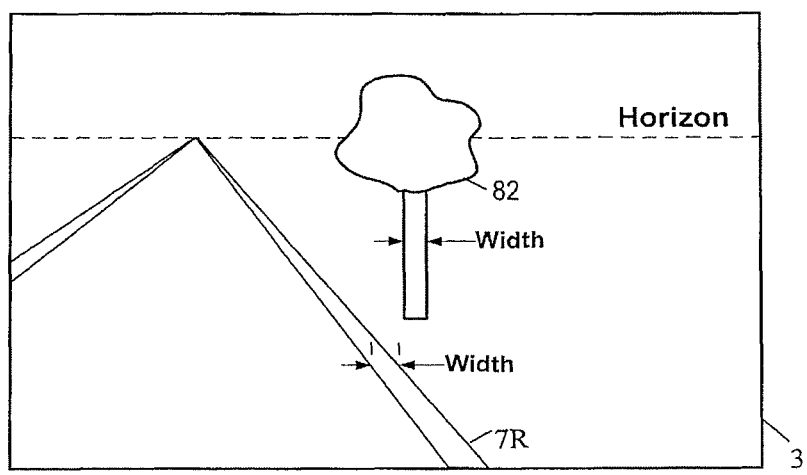
FIG. 20A-B shows an example detection of non-marking detection in the road image.

Another image characteristic in image regions NR and BBR that may be used for classifying what is beyond/before a marking 7L, is how the median spacing between significant gradients varies with row location. As shown by example image 3 in FIG. 20A, markings and other objects, in the road plane, typically appear reduced in length and width as the horizon is approached in the image. The median spacing for such objects tends to also reduce as the horizon is nearer. Not in the road plane objects, such as trees 82, however tend to keep their width and spacing as the horizon is approached.

Figure 20B:
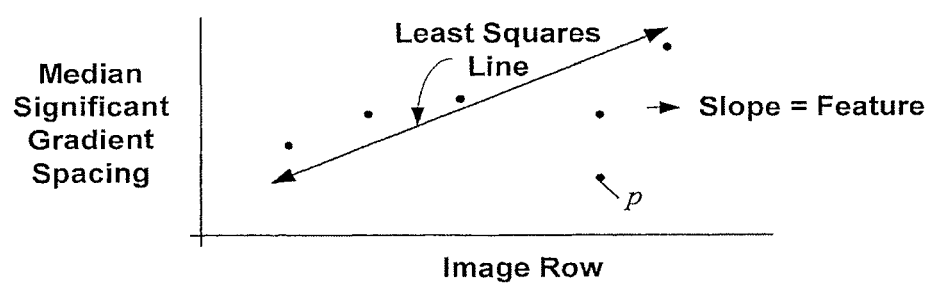

As shown by example in FIG. 20B, a least-squares line relating median significant gradient spacing to image row pixels is calculated, and its slope retained, for describing characteristics of image features corresponding such objects on the road. The rows between the top and bottom of the marking detection ROI (e.g., NR and BBR) are used for such calculation. For example, tree trunks, being nearly parallel to the image plane, maintain their width as the horizon is approached, while in-the-road-plane objects generally do not. A least-squares line fit slope near zero indicates the presence of constant width objects such as trees, which the lane departure detector 9 can utilize in invoking appropriate warning/support accordingly.

Another image characteristic defined by a mean absolute deviation (MAD) of a row or region, may be used for detecting objects in the regions NR and BBR. Smooth regions, such as roads, tend to have low MAD values, while more textured regions, such as trees, will have higher MAD values. MAD is the average absolute deviation from the average. The MAD of luminance for a group of m pixels $p_i$ can be expressed as:

$$MAD=(1/m)\Sigma|p_i-\text{average}(p)|, \text{ wherein } i=1,\ldots,m,$$

with the sum taken over all i.

Figure 21:
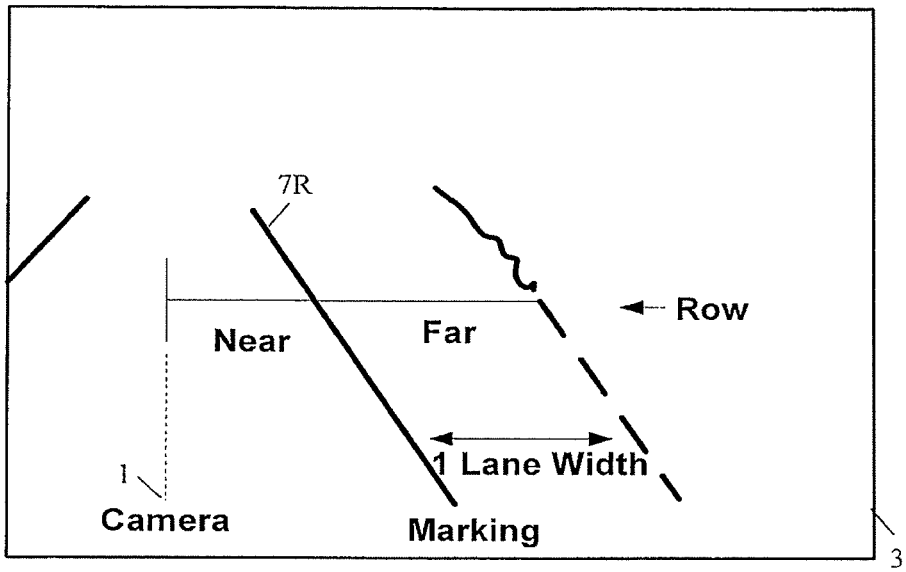
FIG. 21 shows an example mean absolute deviation (MAD) calculation, used for comparing the areas on either side of the road boundary.

Referring to FIG. 21, in one example the MAD values in each row near the camera and then those in the same row, further laterally out from the camera, are determined for image regions extending out to approximately one lane width beyond a detected road marking (e.g., a lane width may be approximately 3 meters). Two MAD values are generated for each image row.

FIG. 21 illustrates comparison of MAD values nearby and those beyond the marking or boundary. A ratio δ of the far to near MAD values in each row is obtained, and the ratios are average. A value of δ near 1 indicates that the texture of the area beyond the marking is similar to the area before the marking. This feature is unusual because it requires two regions as inputs to produce a value.

As such, in this example four image characteristics are considered, wherein is the first characteristic is gradient density per meter, the second characteristic is median gradient spacing in columns, the third characteristic is median gradient spacing row variation, and the fourth characteristic is average MAD ratio. Such image region characteristics can be processed in different ways. Two examples are provided below:

1. Compare the first three characteristics of the region near (NR) the camera to the same three characteristics of that the BBR region beyond the marking (to approximately one lane width beyond), incorporating the average ratio of MAD values as a fourth characteristic comparison. The characteristics are compared for similarity. The first three characteristics are compared using the Manhattan distance.

2. Compare the first three characteristics of what is beyond the marking (BBR) and the average ratio of MAD values to a database, to determine a category in the database with most similar characteristics.

In the first comparison process above, the characteristic comparison results for a region beyond a marking in the image are used by the lane departure detector 9 as a rating of the drivability of the road corresponding to the image region beyond the marking, to then invoke appropriate warning/support functions based on that rating. As the vehicle travels forward combinations of said image characteristics are monitored as the vehicle moves safely forward in a traversable zone (e.g., on the road and following road markings). It is reasonable to expect that if this combination of characteristics (a characteristics vector) is also found in a BBR zone beyond a road marking, then the vehicle we may enter a BBR zone as safe. With an accumulation of safe characteristics vectors being collected as the vehicle moves, the system learns cumulatively about safe zones.

In the second comparison process above, the image characteristics of what is currently measured in BRR is compared with representative typical image characteristics s in a database. This database defines at least two categories (or ratings): safely traversable and not safely traversable. The database may include other categories such as may be traversable, or of intermediate safety level, etc. The database includes every combination of said image characteristics, and assigning a degree of safety to each combination.

The lane departure detector 9 may use the two comparisons in the following manner. If the first comparison indicates a significant difference between what is measured near the camera (NR) and that which is beyond the marking (BBR), then the second comparison is performed. The final result is a decision on how safe it is to enter the area beyond the marking (BBR). This decision, provided as a value between 0.0 and 1.0, modulates the level/type of warning or support provided to the driver during lane support episodes.

Figure 22:
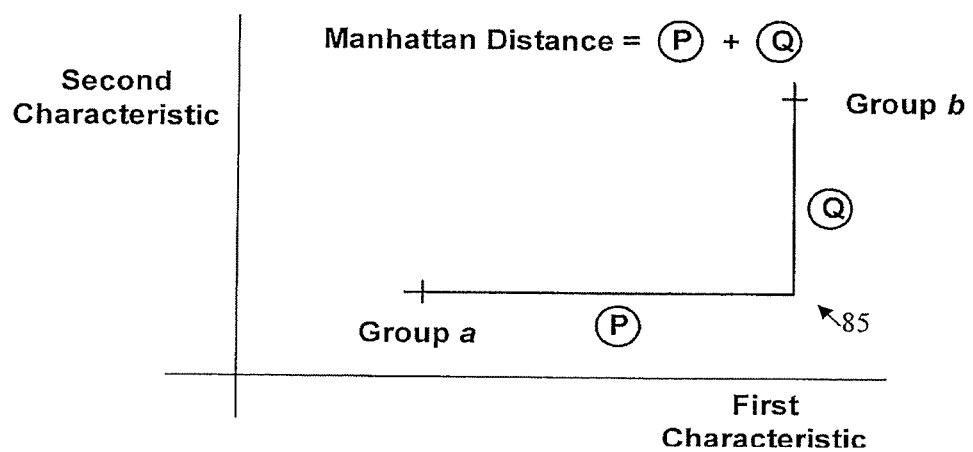
FIG. 22 shows an example of image characteristics similarity computation.

The similarity of one characteristic vector to another is measured by the Manhattan distance between them, as:

Manhattan distance=$|f1\_a-f1\_b|+|f2\_a2\_b|+|f3\_a-f3\_b|$, wherein f1_a is the first characteristic for group a, f2_b is the second characteristic for group b, and f2_c is the second characteristic for group c. For example, group a may include three image characteristic measurements from the road straight ahead which can safely be entered by the vehicle and group b may be from the area beyond the marking. If the first three of said four image characteristic of group a are similar enough to the corresponding ones for group b, then it is expected that entering into the are beyond the marking may be safe. The Manhattan distance may be graphically shown for two dimensions as in FIG. 22. Group a is the average of the features measured for the region beyond the marking (BBR), and group b may be a reference point in the database, denoting, for example, grass or guardrail. Group a is assigned the same category as that reference characteristic vector to which it is most neat in the graph 85. The symbol ⓟ and ⓠ indicate the difference between the first and second image characteristics respectively.

Large distances indicate a significant difference in the region characteristics. The characteristics are normalized before the Manhattan distance calculation. This distance measure is used in the first comparison, and a threshold (e.g., 0 to 1.4, and preferably 0.2 to 0.6) is set for the maximum difference allowed for regions that are ostensibly the same. The fourth characteristics needs to be between 0.8 and 1.2 for the regions to be declared similar.

When the first comparison indicates that the regions are significantly different from one another, the second comparison is triggered. In it simplest form, the characteristics values are applied to a set of rules. The rules assign an identifying category and a degree of safety to each combination of characteristics vectors. One example rule is as follows. If the spacing between significant gradients in a region does not change significantly with image row (checked by finding the slope of a line fit to the row versus median spacing data), then this is not a traversable area and the danger is high, at 1.0. If there are a low number of significant gradients in a region per lateral meter, and a small median spacing exists, then the region correlates to a lower degree of danger. High MAD values in the BRR region correlate with high danger. The above steps can be implemented as 4-dimensional classifier which receives said four characteristics for an image region, and in response provides a degree of danger (or safety) a value between 0.0 (no danger) and 1.0 (high danger).

Figure 23:
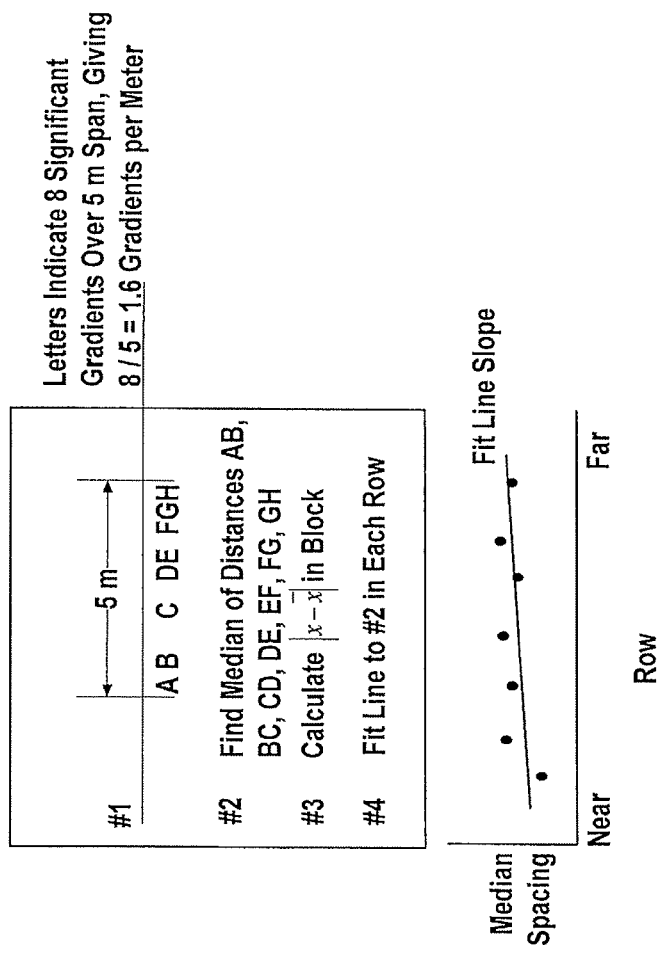
FIG. 23 illustrates graphical examples of different example image characteristics.

FIG. 23 shows four example characteristics graphically. A first characteristic (#1) has 8 significant gradients over a length of 5 meters, giving a gradient density of 8/5 or 1.6 significant gradients per meter. A second characteristic (#2) shows median of the distances between all neighboring gradient pairs which characterizes the distance between neighboring gradients. The third characteristic (#3) shows how MAD is calculated. The third characteristic (#4) illustrates how the median spacing changes approximately (via a least-squares line fit) with row in the image, indicating if what is beyond the marking appears to be flat or upright. A further characteristic may include the average gradient magnitude in a region.

Figure 24:
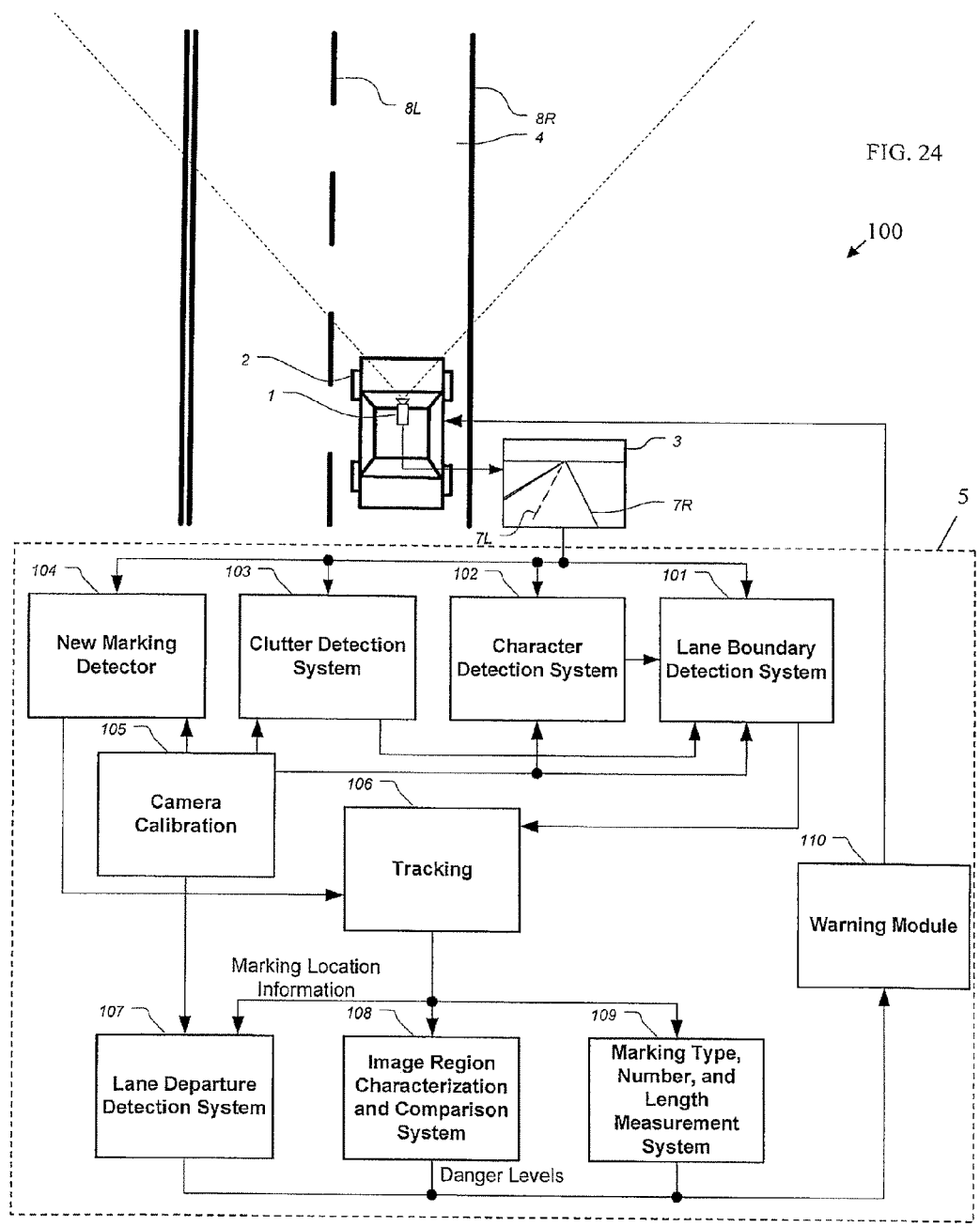
FIG. 24 shows a functional block diagram of another video-based road characterization, lane detection and departure prevention system in conjunction with a vehicle, according to an embodiment of the invention.

FIG. 24 shows a functional block diagram of an example system 100 implementing another embodiment of the controller 5 according to the present invention. A lane boundary detection system 101 detects lane markings as described. The character detection system 102 checks for markings that might disturb the lane boundary detection system and defines bounds (near and far) between which the lane boundary detection system ignores detected image features. The clutter detection system 103 checks for irregular, excessive, and incoherent markings that might confuse the lane boundary detection system, turning off all detections if necessary. The new marking detector 104 checks for sufficiently persistent and consistent, nearer markings that the tracking module 106 can switch to and follow.

The camera calibration module 105 characterizes the internal and external geometry of the camera. The internal geometry includes quantities such as focal length, pixel size, etc., while the external geometry includes the mounting height, pitch angle, etc. The tracking module 106 receives the location measurements of a single identified marking on each side of the camera, smoothes them, predicts where the markings will be in the next frame, and determines whether the prediction can still be done (prediction is appropriate for a certain distance before it is too unreliable). The lane departure detection system 107 determines if the vehicle is too close to a road marking. The input is the smoothed measurement from the tracking module. The output is a decision as whether to warn or not.

The image region characterization and comparison system 108 first compares the area ahead of the vehicle with approximately one lane width beyond the marking/boundary, determining if these have similar characteristics. If they do, it may be safe to enter the area beyond the marking and an extra strong warning need not be given. If the areas are different, then the features of the area beyond the marking is compared with a database, which classifies this area as safe, possibly safe, and not safe. This classification then affects the warning given. The warning given is also affected by the attributes of the markings such as the number and type of markings present. A double, solid, lane marking causes a stronger warning to be given than a single, dashed, line. Rules combine the image region classification with the marking type, and this combination then influences the strength or nature of the warning given. The marking type and number system 109 determines whether the markings themselves indicate that it is unsafe to depart the lane. The warning module 110 warns or supports the driver in keeping the lane or road position. The inputs are the decision to warn and the degree of danger posed or indicated by the markings and area beyond.

Figure 25:
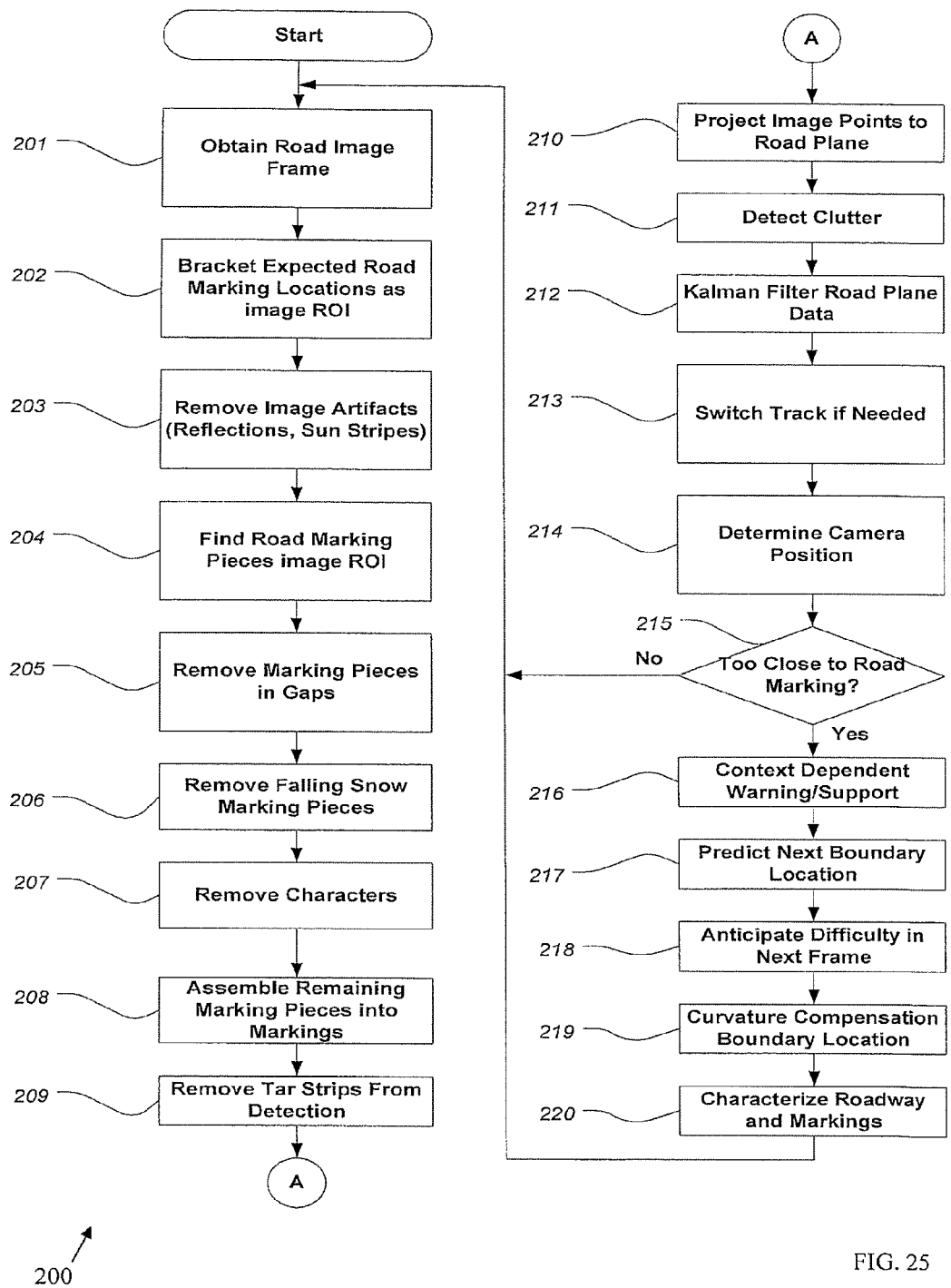
FIG. 25 shows a flowchart of the steps of a video-based road characterization, lane detection and departure prevention process implemented by the system of FIG. 24.

FIG. 25 shows a flowchart of the process progression 200 implemented by the system 100, including the following steps:

Step 201: Obtain Road Image Frame.
Step 202: Bracket Expected Road Marking Locations as image ROI.
Step 203: Remove Image Artifacts (Reflections, Sun Stripes).
Step 204: Find Road Marking Pieces image ROI.
Step 205: Remove Marking Pieces in Gaps.
Step 206: Remove Falling Snow Marking Pieces.
Step 207: Remove Characters From Detection.
Step 208: Assemble remaining marking pieces into markings Step 209: Remove Tar Strips From Detection.
Step 210: Project Image Points to Road Plane By Geometrical Transformation.
Step 211: Detect Clutter.
Step 212: Kalman Filter Road Plane Data.
Step 213: Switch Track if Needed.
Step 214: Determine Camera/Vehicle Position Relative to Markings.
Step 215: Too Close to Road Marking? If yes, then go to step 216, else go to step 201.
Step 216: Provide Context Dependent Warning/Support.
Step 217: Predict Next Lane Marking Location in Next Image Frame.
Step 218: Anticipate Difficulty in Next Frame.
Step 219: Perform Curvature Compensation for Detected Road Markings.
Step 220: Characterize Roadway and Markings. Go to step 201.

Roadway scenes appear different during nighttime and daytime. This different appearance manifests itself as stronger contrasts at nighttime, a lower background noise level at night, etc. Such information can be used for analyzing roadway images. Bright scenes have low imager exposure times and or gains.

Dark scenes have high imager exposure times and or gains. Maintaining a history of the exposure times and gains (e.g., one minute in length) allows determining whether more low/high and short/long settings have occurred, allowing for a "do not know" zone (i.e., if there are more than a certain number of day related imager settings, it is daytime; if there are more than a certain number of night related imager settings, it is nighttime).

A precise calibration of the camera is preferable for precise performance. The camera related quantities used in the geometrical transform equations, where camera height, focal length, pitch angle, etc. play a role. The calibration establishes the intrinsic parameters (parameters for the camera by itself, such as focal length, optical axis location, etc.) and the extrinsic parameters (related to where the camera is installed in the vehicle, such as mounting height, pitch angle, distance from vehicle centerline, etc.).

All the measured information of where markings are, what they are, how many there are, what is probably beyond the marking, etc. can be assembled into a description of the road, characterizing it.

Figure 26:
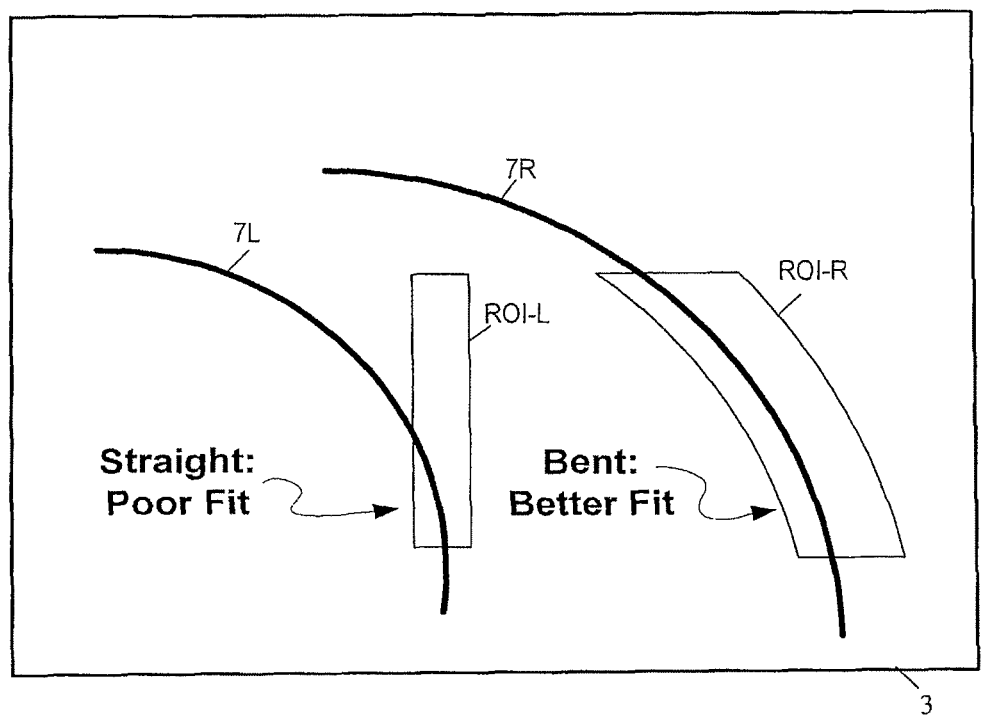
FIG. 26 shows an example of fitting ROI to markings on curved roads.

Tight curves do not fit into the straight regions of interest as well as straight markings. Markings are typically found better when near the camera. This affects placement and/or shape of the regions of interest so that they better follow curves, favoring finding marking pieces near the camera, if possible. As shown by example in FIG. 26, with the regions of interest properly placed for a proper fit (e.g., ROI-R), markings with a smaller radius can be better detected.

Further, real-time calibration can be used to learn the pitch and yaw angles of the camera during operation. This learning uses the location of the vanishing point (the spot where the sides of a straight road appear to come together in the distance) as its input. A camera that consistently points to the side (yawed) has the vanishing point located on average, to one side also. A camera that points up or down will have, on average, the vanishing point located higher or lower in the image. Only one marking or boundary of the road is required to be visible in any given frame. The online learning influences the location of the warnings and support, making them more precise.

The steps/processes above can be performed in real-time, or on stored imagery. The processing may further be performed in a single CPU, with a preprocessing stage, or in multiple CPUs, and in parallel as appropriate. As is known to those skilled in the art, the aforementioned example architectures described above, according to the present invention, can be implemented in many ways, such as program instructions for execution by a processor, as software modules, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

The invention claimed is:

1. A method of video-based road departure warning for a vehicle on a road, comprising the steps of:
   receiving an image of a road in front of the vehicle from a video imager;
   detecting one or more road markings in the image corresponding to markings on the road;
   analyzing characteristics of an image region beyond the detected markings to determine a rating for drivability of the road corresponding to said image region, wherein the characteristics of the image region beyond the detected markings comprise a median gradient spacing row variation;
   detecting a lateral offset of the vehicle relative to the markings on the road based on the detected road markings;
   generating a warning signal as a function of said lateral offset and said rating; and
   wherein the step of analyzing characteristics of the image region beyond the detected markings to determine the rating for drivability further comprises comparing the characteristics of the image region beyond the detected markings to characteristics of an image region within the detected markings or to values in a database.

2. The method of claim 1, wherein the step of detecting one or more road markings in the image includes determining a region of interest in the image and detecting one or more road markings in the region of interest.

3. The method of claim 1, wherein:
   the step of detecting one or more road markings in the image further includes determining attributes of the road markings; and
   the step of generating a warning signal further includes generating a warning signal as a function of said lateral offset, said rating, and said attributes.

4. The method of claim 3, wherein determining attributes of the road markings further includes determining the type and the number of the detected road markings.

5. The method of claim 1, wherein detecting road markings further includes detecting image features representing characters on the road, and removing such image features from consideration in detecting road markings.

6. The method of claim 5, further including the step of tracking the detected road markings.

7. The method of claim 1, further including selecting a set of road markings among the detected road markings based on relevancy of the road markings.

8. The method of claim 7, further including the step of tracking the selected road markings.

9. The method of claim 1, wherein detecting road markings further includes detecting clutter in the image, and eliminating the detected clutter in detecting road markings.

10. An apparatus for video-based road departure warning for a vehicle on a road, comprising:
    an image processing function configured for receiving an image of a road in front of a vehicle from a video imager;

a road marking detector configured for detecting one or more road markings in the image corresponding to markings on the road using an image processing device;

a characterization module configured for analyzing characteristics of an image region beyond the detected markings to determine a rating for drivability of the road corresponding to said image region, wherein the characteristics of the image region beyond the detected markings comprise a median gradient spacing row variation;

an offset detection function configured for detecting a lateral offset of the vehicle relative to the markings on the road based on the detected road markings, a lane departure detector configured for generating a warning signal as a function of said lateral offset and said rating;

a controller configured for controlling operation of one or more of the image processing function, road marking detector, characterization module, offset detection function and lane departure detector; and wherein the characterization module configured for analyzing characteristics of the image region beyond the detected markings to determine the rating for drivability is further configured for comparing the characteristics of the image region beyond the detected markings to characteristics of an image region within the detected markings or to values in a database.

11. The apparatus of claim 10, wherein the road marking detector is further configured for determining a region of interest in the image and detecting one or more road markings in the region of interest.

12. The apparatus of claim 10, further including a marking attribute function configured for determining attributes of the road markings; and wherein the lane departure detector is further configured for generating a warning signal as a function of said lateral offset, said rating, and said attributes.

13. The apparatus of claim 12, wherein the marking attribute function is further configured for determining the type and the number of the detected road markings.

14. The apparatus of claim 10, further including a character detection function, configured for detecting image features representing characters on the road, and removing such image features from consideration in detecting road markings.

15. The apparatus of claim 14, further including a tracking module configured for tracking the detected road markings in one or more road image frames.

16. The apparatus of claim 10, further including a marking selection function configured for selecting a set of road markings among the detected road markings based on relevancy of the road markings.

17. The apparatus of claim 16, further including a tracking module configured for tracking the selected road markings in one or more road image frames.

18. The apparatus of claim 10, further including a clutter detector, configured for detecting clutter in the image, and eliminating the detected clutter in detecting road markings.

19. The apparatus of claim 10, further including a reflection detector, configured for detecting road surface reflection features in the image, and eliminating the reflection features from road marking detection.

20. The apparatus of claim 10, further including a tar strip detector, configured for detecting road surface tar strip features in the image, and eliminating the tar strip features from road marking detection.

21. A system for video-based road departure warning for a vehicle on a road, comprising:

a video imager configured for generating an image of a road in front of a vehicle;

an image processing function configured for determining a region of interest in the image using an image processing device, a road marking detector configured for detecting one or more road markings in the image corresponding to markings on the road;

a characterization module configured for analyzing characteristics of a image region beyond the detected markings, to determine a rating for drivability of the road corresponding to said image region, wherein the characteristics of the image region beyond the detected markings comprise a median gradient spacing row variation;

an offset detection function configured for detecting a lateral offset of the vehicle relative to the markings on the road based on the detected road markings;

a lane departure detector configured for generating a warning signal as a function of said lateral offset and said rating;

a controller configured for controlling operation of one or more of the imager, image processing function, road marking detector, characterization module, offset detection function and lane departure detector; and wherein the characterization module configured for analyzing characteristics of the image region beyond the detected markings to determine the rating for drivability is further configured for comparing the characteristics of the image region beyond the detected markings to characteristics of an image region within the detected markings or to values in a database.

22. The system of claim 21, further including a marking attribute function configured for determining attributes of the road markings; and wherein the lane departure detector is further configured for generating a warning signal as a function of said lateral offset, and said rating and said attributes.

23. The system of claim 22, wherein the marking attribute function is further configured for determining the type and the number of the detected road markings.

24. The system of claim 21, further including a tracking module configured for tracking the detected road markings in one or more road image frames.

25. The system of claim 21, further including a marking selection function configured for selecting a set of road markings among the detected road markings based on relevancy of the road markings, and a tracking module configured for tracking the selected road markings in one or more road image frames.

26. The method of claim 1, wherein the comparison of characteristics is measured by a Manhattan distance, such that:

$$\text{Manhattan distance} = |f1\_a - f1\_b| + |f2\_a2\_b| + |f3\_a - f3\_b|,$$

where:
f1_a is a first characteristic for a group a,
f1_b is a first characteristic for a group b,
f2_a is a second characteristic for the group a,
f2_b is a second characteristic for the group b,
f3_a is a third characteristic for the group a, and
f3_b is a third characteristic for the group b.

27. The apparatus of claim 10, wherein the characterization module configured for comparing the characteristics of the image region beyond the detected markings to characteristics of an image region within the detected markings or to values in a database is further configured for measuring the comparison of the characteristics by a Manhattan distance, such that:

Manhattan distance=$|f1\_a-f1\_b|+|f2\_a2\_b|+|f3\_a-f3\_b|$, where:
f1_a is a first characteristic for a group a,
f1_b is a first characteristic for a group b,
f2_a is a second characteristic for the group a,
f2_b is a second characteristic for the group b,
f3_a is a third characteristic for the group a, and
f3_b is a third characteristic for the group b.

28. The system of claim 21, wherein the characterization module configured for comparing the characteristics of the image region beyond the detected markings to characteristics of an image region within the detected markings or to values in a database is further configured for measuring the comparison of the characteristics by a Manhattan distance, such that:

Manhattan distance=$|f1\_a-f1\_b|+|f2\_a2\_b|+|f3\_a-f3\_b|$, where:
f1_a is a first characteristic for a group a,
f1_b is a first characteristic for a group b,
f2_a is a second characteristic for the group a,
f2_b is a second characteristic for the group b,
f3_a is a third characteristic for the group a, and
f3_b is a third characteristic for the group b.

29. The method of claim 1, wherein the step of comparing the characteristics of the image region beyond the detected markings to characteristics of an image region within the detected markings or to values in a database further comprises an average mean absolute deviation (MAD) ratio.

30. The apparatus of claim 10, wherein the characterization module configured for comparing the characteristics of the image region beyond the detected markings to characteristics of an image region within the detected markings or to values in a database is further configured for analyzing an average mean absolute deviation (MAD) ratio.

31. The system of claim 21, wherein the characterization module configured for comparing the characteristics of the image region beyond the detected markings to characteristics of an image region within the detected markings or to values in a database is further configured for analyzing an average mean absolute deviation (MAD) ratio.

* * * * *